US012681269B2

(12) United States Patent
Jeong

(10) Patent No.: US 12,681,269 B2
(45) Date of Patent: Jul. 14, 2026

(54) OPTICAL IMAGING SYSTEM

(71) Applicant: Samsung Electro-Mechanics Co., Ltd., Suwon-si (KR)

(72) Inventor: You Jin Jeong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 310 days.

(21) Appl. No.: 18/237,060

(22) Filed: Aug. 23, 2023

(65) Prior Publication Data

US 2024/0184084 A1    Jun. 6, 2024

(30) Foreign Application Priority Data

Nov. 30, 2022    (KR) ........................ 10-2022-0164605

(51) Int. Cl.
G02B 9/64        (2006.01)
G02B 13/00      (2006.01)
(52) U.S. Cl.
CPC .......... G02B 9/64 (2013.01); G02B 13/0045 (2013.01)
(58) Field of Classification Search
None
See application file for complete search history.

(56) References Cited

U.S. PATENT DOCUMENTS

2013/0141804 A1    6/2013  Liu et al.
2017/0307858 A1    10/2017  Chen

2020/0209593 A1    7/2020   Hirano
2020/0393652 A1    12/2020  Kuo
2020/0393653 A1    12/2020  Chen
2021/0364746 A1    11/2021  Chen
2022/0066146 A1    3/2022   Huang
2022/0066148 A1*   3/2022   Zhao .................. G02B 13/0045
2022/0171162 A1    6/2022   Jang et al.
2022/0196977 A1    6/2022   Lai et al.

(Continued)

FOREIGN PATENT DOCUMENTS

CN    114114617 A    3/2022
CN    114355568 A    4/2022

(Continued)

OTHER PUBLICATIONS

Taiwanese Office Action issued on Mar. 12, 2024, in counterpart Taiwanese Patent Application No. 112133163 (7 pages in English, 5 pages in Chinese).

(Continued)

*Primary Examiner* — Darryl J Collins
(74) *Attorney, Agent, or Firm* — NSIP Law

(57)    ABSTRACT

An optical imaging system includes first to ninth lenses, wherein the first lens has a positive refractive power, the second lens has a negative refractive power, the fourth lens has a positive refractive power, a refractive index of the second lens is greater than a refractive index of the first lens and a refractive index of the third lens, each of at least two lenses including the second lens has a refractive index equal to or greater than 1.67, and TTL/(2×IMG HT)<0.69 and 25<v1−v2<45 are satisfied, where TTL is a distance on an optical axis from an object-side surface of the first lens to an imaging surface, IMG HT is one half of a diagonal length of the imaging surface, v1 is an Abbe number of the first lens, and v2 is an Abbe number of the second lens.

20 Claims, 20 Drawing Sheets

(56) References Cited

U.S. PATENT DOCUMENTS

| | | | | |
|---|---|---|---|---|
| 2022/0196979 A1 | 6/2022 | Lin et al. | | |
| 2022/0196980 A1 | 6/2022 | Lai et al. | | |
| 2022/0244500 A1* | 8/2022 | Tseng | ....................... | G02B 9/64 |
| 2023/0221525 A1* | 7/2023 | Jhang | ....................... | G02B 9/64 |
| | | | | 359/692 |
| 2023/0221526 A1* | 7/2023 | Dong | ....................... | G02B 9/64 |
| | | | | 359/692 |
| 2023/0221528 A1 | 7/2023 | Jhang et al. | | |
| 2023/0221530 A1 | 7/2023 | Zhu et al. | | |
| 2024/0103253 A1* | 3/2024 | Kuo | ......................... | G02B 9/64 |
| 2024/0280787 A1* | 8/2024 | Kwon | ............... | G02B 13/0045 |

FOREIGN PATENT DOCUMENTS

| | | | |
|---|---|---|---|
| CN | 114355569 A | 4/2022 | |
| CN | 114740591 A | 7/2022 | |
| KR | 10-2022-0075942 A | 6/2022 | |
| TW | 202144846 A | 12/2021 | |
| TW | 202208922 A | 3/2022 | |
| TW | 202225767 A | 7/2022 | |
| TW | 202225769 A | 7/2022 | |
| TW | 202240230 A | 10/2022 | |

OTHER PUBLICATIONS

Korean Office Action issued on Nov. 7, 2024, in counterpart Korean Patent Application No. 10-2022-0164605 (9 pages in English, 7 pages in Korean).

Taiwanese Office Action Issued on May 15, 2025, in counterpart Taiwanese Patent Application No. 114113838 (13 pages in English, 8 pages in Chinese).

Taiwanese Office Action issued on May 8, 2026, in counterpart Taiwanese Patent Application No. 115113701 (10 pages in English, 8 pages in Chinese).

* cited by examiner

100

101 102 103 104 105 106 107 108 109 110 111 IS

200

201 202 203 204 205 206 207 208 209 210 211 IS

400

401 403 405
402 404 406
407
408
409
410   411   IS

500

501
502
503
504
505
506
507
508
509
510
511
IS

700

701 703 705
702 704 706
707
708
709
710 711 IS

OPTICAL IMAGING SYSTEM

CROSS-REFERENCE TO RELATED APPLICATIONS

This application claims the benefit under 35 USC 119(a) of Korean Patent Application No. 10-2022-0164605 filed on Nov. 30, 2022, in the Korean Intellectual Property Office, the entire disclosure of which is incorporated herein by reference for all purposes.

BACKGROUND

1. Field

The present disclosure relates to an optical imaging system.

2. Description of Related Art

Portable terminals have recently included a camera including an optical imaging system including a plurality of lenses to enable video calls and image capturing operations.

Additionally, with a gradual increase in the uses of cameras in portable terminals, the demand for cameras for portable terminals having a high resolution has increased.

Additionally, as the form factor of portable terminals has decreased, miniaturized cameras for portable terminals are also desired. Accordingly, the development of an optical imaging system achieving a high resolution while being slim is desired.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, a seventh lens, an eighth lens, and a ninth lens sequentially arranged in ascending numerical order along an optical axis of the optical imaging system from an object side of the optical imaging system toward an imaging surface of the optical imaging system, wherein the first lens has a positive refractive power, the second lens has a negative refractive power, and the fourth lens has a positive refractive power, a refractive index of the second lens is greater than a refractive index of the first lens and a refractive index of the third lens, each of at least two lenses including the second lens among the first to ninth lenses has a refractive index equal to or greater than 1.67, and TTL/(2×IMG HT)<0.69 and 25<v1−v2<45 are satisfied, where TTL is a distance on the optical axis from an object-side surface of the first lens to the imaging surface, IMG HT is one half of a diagonal length of the imaging surface, v1 is an Abbe number of the first lens, and v2 is an Abbe number of the second lens.

The conditional expression 25<v1−v5<45 may be satisfied, where v5 is an Abbe number of the fifth lens.

Each of the second lens and the fifth lens may have a refractive index equal to or greater than 1.67.

The seventh lens may have a refractive index greater than 1.61, and 25<v1−v7<35 may be satisfied, where v7 is an Abbe number of the seventh lens.

The conditional expression 1.660≤Nmax≤1.700 may be satisfied, where Nmax is a maximum value of refractive indexes of the first to ninth lenses.

The conditional expression 10<v8−v7<15 may be satisfied, where v7 is an Abbe number of the seventh lens, and v8 is an Abbe number of the eight lens.

The conditional expression 1.3<f/EPD<1.51 may be satisfied, where f is a total focal length of the optical imaging system, and an EPD is an entrance pupil diameter of the optical imaging system.

Either one or both of 0<D1/f<0.05 and 0<D3/f<0.05 may be satisfied, where D1 is a distance on the optical axis between an image-side surface of the first lens and an object-side surface of the second lens, D3 is a distance on the optical axis between an image-side surface of the third lens and an object-side surface of the fourth lens, and f is a total focal length of the optical imaging system.

The conditional expression 0.8<(2×D34)/D12<1.1 may be satisfied, where D12 is a distance on the optical axis from an object-side surface of the first lens to an image-side surface of the second lens, and D34 is a distance on the optical axis from an object-side surface of the third lens to an image-side surface of the fourth lens.

The conditional expression BFL/f<0.25 may be satisfied, where BFL is a distance on the optical axis from an image-side surface of the ninth lens to the imaging surface.

The conditional expression 0.8<f1/f<1.2 may be satisfied, where f1 is a focal length of the first lens, and f is a total focal length of the optical imaging system.

The conditional expression |f2|>|f1| may be satisfied, where |f2| is an absolute value of a focal length f2 of the second lens, and |f1| is an absolute value of a focal length f1 of the first lens.

The conditional expression −2.6<f2/f1<−2 may be satisfied.

The conditional expression f34>0 and f34>|f2| may be satisfied, where f34 is a synthetic focal length of the third lens and the fourth lens, and |f2| is an absolute value of a focal length f2 of the second lens.

The conditional expression 1.25<f34/|f2|<1.7 may be satisfied.

Each of the first lens to the fifth lens may have a convex object-side surface in a paraxial region thereof, and a concave image-side surface in a paraxial region thereof.

Each of the sixth lens may have a convex object-side surface in a paraxial region thereof, and a convex image-side surface in a paraxial region thereof.

The sixth lens may have a convex object-side surface in a paraxial region thereof, and a concave image-side surface in a paraxial region thereof.

The sixth lens may have a concave object-side surface in a paraxial region thereof, and a convex image-side surface in a paraxial region thereof.

Each of the seventh lens to the ninth lens may have a convex object-side surface in a paraxial region thereof, and a concave image-side surface in a paraxial region thereof.

The ninth lens may have a negative refractive power.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
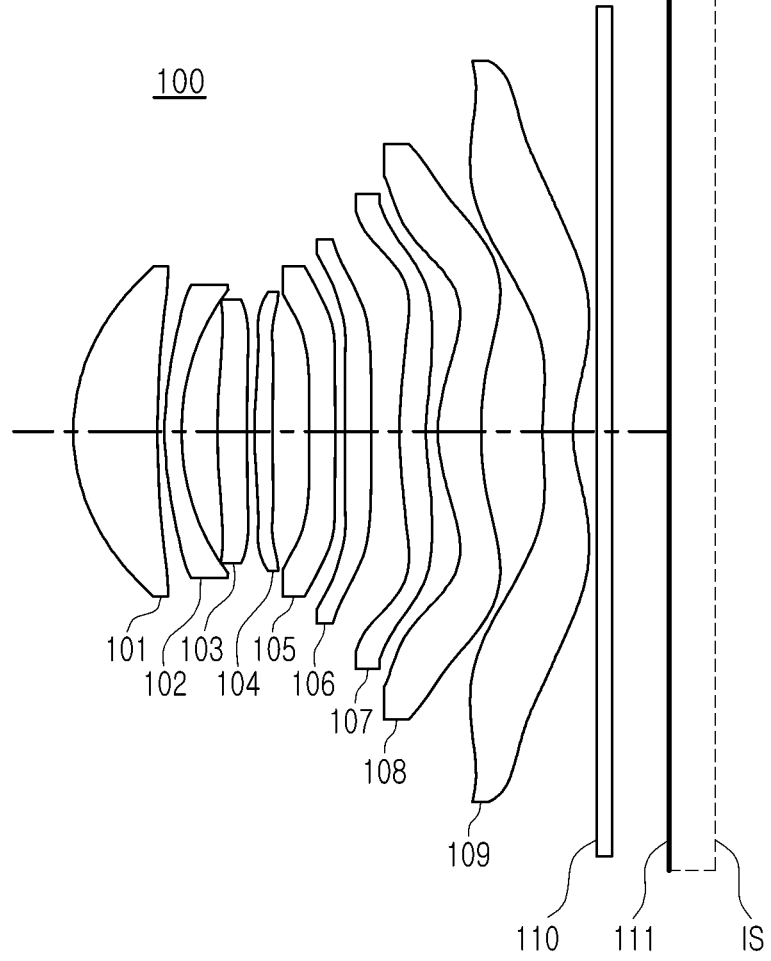
FIG. 1 illustrates a structural view of an optical imaging system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In the structural views of the optical imaging systems in the drawings, the thickness, size, and shape of the lenses may be somewhat exaggerated for ease of description, and specifically, the shape of a spherical or non-spherical surface shown in the structural views is only presented as an example, but is not limited thereto.

An optical imaging system according to an embodiment of the present disclosure includes nine lenses.

A first lens refers to the lens closest to an object side of the optical imaging system, and a ninth lens refers to the lens closest to an imaging surface (or an image sensor or an image side) of the optical imaging system.

Additionally, for each lens, a first side denotes a side closest to the object side of the optical imaging system (or an object-side surface), and a second side denotes a side closest to an image side of the optical imaging system (or an image-side surface). Additionally, in the one or more examples, the values of the radiuses of curvature, thicknesses, distances, and focal lengths of the lenses are expressed in millimeters (mm), and the fields of view (FOV) are expressed in degrees.

Additionally, in the description of the shape of each lens, a statement that a surface of a lens is convex means that the surface is convex in a paraxial region of the surface, and a statement that a surface of a lens is concave means that the surface is concave in a paraxial region of the surface.

Accordingly, even if a surface of a lens is described as having a convex shape, an edge portion of the surface may have a concave shape. Similarly, even if a surface of a lens is described as having a concave shape, an edge portion of the surface may have a convex shape.

A paraxial region of a lens surface is a central portion of the lens surface surrounding the optical axis of the lens surface in which light rays incident to the lens surface make a small angle $\theta$ to the optical axis, and the approximations $\sin\theta\approx\theta$, $\tan\theta\approx\theta$, and $\cos\theta\approx1$ are valid.

The imaging surface may be a virtual surface on which an image is focused by the optical imaging system. Alternatively, the imaging surface may be a surface of an image sensor on which an image is focused by the optical imaging system.

An optical imaging system according to an embodiment of the present disclosure includes at least nine lenses.

For example, an optical imaging system according to an embodiment of the present disclosure includes a first lens, a second lens, a third lens, a fourth lens, a fifth lens, a sixth lens, a seventh lens, an eighth lens, and a ninth lens sequentially arranged in ascending numerical order along an optical axis of the optical imaging system from an object side of the optical imaging system toward an image side of the optical imaging system. The first to ninth lenses are spaced apart from each other by respective predetermined distances along the optical axis.

An optical imaging system according to an embodiment of the present disclosure may further include an image sensor that converts an image of an object focused on the image sensor by the optical imaging system into an electrical signal.

Additionally, the optical imaging system may further include an infrared filter (hereinafter referred to as a "filter") blocking infrared rays. The filter may be disposed between the ninth lens and the image sensor.

Additionally, the optical imaging system may further include an aperture that adjusts an amount of light that is incident on the image sensor.

The first to ninth lenses constituting the optical imaging system according to an embodiment of the present disclosure may be made of a plastic material.

Additionally, any one or any combination of any two or more of the first to ninth lenses may have an aspherical surface. For example, each of the first to ninth lenses may have at least one aspherical surface.

That is, either one or both of the first and second surfaces of the first to ninth lenses may be an aspherical surface. The aspherical surfaces of the first to ninth lenses are represented by Equation 1 below.

$$Z = \frac{cY^2}{1 + \sqrt{1 - (1 + K)c^2Y^2}} + AY^4 + BY^6 + CY^8 + DY^{10} + EY^{12} + \qquad (1)$$
$$FY^{14} + GY^{16} + HY^{18} + JY^{20} + LY^{22} + MY^{24} + NY^{26} + OY^{28} + PY^{30}$$

In Equation 1, c is a curvature of the lens and is equal to a reciprocal of a radius of curvature of the lens surface at an optical axis of the lens surface, K is a conic constant, and Y is a distance from any point on the aspherical surface of the lens to the optical axis in a direction perpendicular to the optical axis. Additionally, constants A to H, J, and L to P are aspherical coefficients. Furthermore, Z (also known as sag) is a distance in a direction parallel to an optical axis direction between the point on the aspherical surface of the lens at the distance Y from the optical axis of the aspherical surface to a tangential plane perpendicular to the optical axis and intersecting a vertex of the aspherical surface.

The optical imaging system according to an embodiment of the present disclosure may satisfy any one or any combination of any two or more of the following conditional expressions.

| | |
|---|---|
| $TTL/(2 \times IMG\ HT) < 0.69$ | (Conditional Expression 1) |
| $1.3 < f/EPD < 1.51$ | (Conditional Expression 2) |
| $0 < D1/f < 0.05$ | (Conditional Expression 3) |
| $25 < v1-v2 < 45$ | (Conditional Expression 4) |
| $1.660 \leq N\max \leq 1.700$ | (Conditional Expression 5) |
| $0.8 < f1/f < 1.2$ | (Conditional Expression 6) |
| $BFL/f < 0.25$ | (Conditional Expression 7) |
| $0 < D3/f < 0.05$ | (Conditional Expression 8) |
| $25 < v1-v5 < 45$ | (Conditional Expression 9) |
| $25 < v1-v7 < 35$ | (Conditional Expression 10) |
| $10 < v8-v7 < 15$ | (Conditional Expression 11) |
| $-2.6 < f2/f1 < -2$ | (Conditional Expression 12) |
| $1.25 < f34/1f2 < 1.7$ | (Conditional Expression 13) |
| $0.8 < (2 \times D34)/D12 < 1.1$ | (Conditional Expression 14) |

In the above conditional expressions, f is a total focal length of the optical imaging system, f1 is a focal length of the first lens, f2 is a focal length of the second lens, and f34 is a synthetic focal length of the third and fourth lenses.

v1 is an Abbe number of the first lens, v2 is an Abbe number of the second lens, v5 is an Abbe number of the fifth lens, v7 is an Abbe number of the seventh lens, and v8 is an Abbe number of the eighth lens.

TTL is a distance on the optical axis from an object-side surface of the first lens to the imaging surface, and BFL is a distance on the optical axis from an image-side surface of the ninth lens to the imaging surface.

D1 is a distance on the optical axis between the image-side surface of the first lens and the object-side surface of the second lens, D3 is a distance on the optical axis between the image-side surface of the third lens and the object-side surface of the fourth lens, D12 is a distance on the optical axis from the object-side surface of the first lens to the image-side surface of the second lens, D34 is a distance on the optical axis from the object-side surface of the third lens to the image-side surface of the fourth lens, and EPD is an entrance pupil diameter of the optical imaging system. The value f/EPD in Conditional Expression 2 is the f-number of the optical imaging system.

IMG HT is one half of a diagonal length of the imaging surface, and Nmax is a maximum value of refractive indexes of the first to ninth lenses.

The first to ninth lenses constituting the optical imaging system according to an embodiment of the present disclosure will be described.

The first lens has a positive refractive power. Additionally, the first lens may have a meniscus shape convex toward the object side. That is, a first surface of the first lens may have a shape convex in the paraxial region, and a second surface of the first lens may have a shape concave in the paraxial region.

The second lens has a negative refractive power. Additionally, the second lens may have a meniscus shape convex toward the object side. That is, a first surface of the second lens may have a shape convex in the paraxial region, and a second surface of the second lens may have a shape concave in the paraxial region.

The third lens has a positive or a negative refractive power. Additionally, the third lens may have a meniscus shape convex toward the object side. That is, a first surface of the third lens may have a shape convex in the paraxial region, and a second surface of the third lens may have a shape concave in the paraxial region.

The fourth lens has a positive refractive power. Additionally, the fourth lens may have a meniscus shape convex toward the object side. That is, a first surface of the fourth lens may have a shape convex in the paraxial region, and a second surface of the fourth lens may have a shape concave in the paraxial region.

The fifth lens has a positive or a negative refractive power. Additionally, the fifth lens may have a meniscus shape convex toward the object side. That is, a first surface of the fifth lens may have a shape convex in the paraxial region, and a second surface of the fifth lens may have a shape concave in the paraxial region.

The sixth lens has a positive or a negative refractive power. Additionally, the sixth lens may have a shape in which both surfaces thereof are convex. That is, a first surface and a second surface of the sixth lens may have a shape convex in the paraxial region.

Alternatively, the sixth lens may have a meniscus shape convex toward the object side. That is, the first surface of the sixth lens may have a shape convex in the paraxial region, and the second surface of the sixth lens may have a shape concave in the paraxial region.

Alternatively, the sixth lens may have a meniscus shape convex toward the image side. That is, the first surface of the sixth lens may have a shape concave in the paraxial region, and the second surface of the sixth lens may have a shape convex in the paraxial region.

Additionally, the sixth lens may have at least one inflection point formed on either one or both of the first surface and the second surface. For example, when the first surface of the sixth lens is convex in the paraxial region, a portion other than the paraxial region may have a concave shape. When the second surface of the sixth lens is convex in the paraxial region, a portion other than the paraxial region may have a concave shape.

The seventh lens has a positive or a negative refractive power. Additionally, the seventh lens may have a meniscus shape convex toward the object side. That is, a first surface of the seventh lens may have a shape convex in the paraxial region, and a second surface of the seventh lens may have a shape concave in the paraxial region.

Additionally, the seventh lens may have at least one inflection point formed on either one or both of the first surface and the second surface. For example, the first surface of the seventh lens may have a shape convex in the paraxial region, and a shape concave in a portion other than the paraxial region. The second surface of the seventh lens may have a shape concave in the paraxial region, and a shape convex in a portion other than the paraxial region.

The eighth lens has a positive or a negative refractive power. Additionally, the eighth lens may have a meniscus shape convex toward the object side. That is, a first surface of the eighth lens may have a shape convex in the paraxial region, and a second surface of the eighth lens may have a shape concave in the paraxial region.

Additionally, the eighth lens may have at least one inflection point formed on either one or both of the first surface and the second surface. For example, the first surface of the eighth lens may have a shape convex in the paraxial region, and a shape concave in a portion other than the paraxial region. The second surface of the eighth lens may have a shape concave in the paraxial region, and a shape convex in a portion other than the paraxial region.

The ninth lens has a negative refractive power. Additionally, the ninth lens may have a meniscus shape convex toward the object side. That is, a first surface of the ninth lens may have a shape convex in the paraxial region, and the second surface of the ninth lens may have a shape concave in the paraxial region.

Additionally, the ninth lens may have at least one inflection point formed on either one or both of the first surface and the second surface. For example, the first surface of the ninth lens may have a shape convex in the paraxial region, and a shape concave in a portion other than the paraxial region. The second surface of the ninth lens may have a shape concave in the paraxial region, and a shape convex in a portion other than the paraxial region.

The second lens may have a refractive index different from a refractive index of the first lens and a refractive index of the third lens. For example, the first lens and the second lens may have different refractive indexes, and the second lens and the third lens may have different refractive indexes. Additionally, a refractive index of the second lens may be the largest among the first to third lenses.

At least three lenses including the second lens among the first to eighth lenses may have a refractive index greater than 1.61. Furthermore, at least two of the lenses having the refractive index greater than 1.61 may have a refractive index of 1.67 or more.

For example, the second lens, the fifth lens, and the seventh lens may have a refractive index greater than 1.61. Additionally, the second lens and the fifth lens may have a refractive index of 1.67 or more.

The second lens and the fifth lens may have a refractive index of 1.66 or more, and an Abbe number may be less than 20. The seventh lens may have a refractive index greater than 1.61 and less than 1.65, and an Abbe number thereof may be less than 29.

An absolute value of a focal length of the second lens may be greater than an absolute value of a focal length of the first lens.

A synthetic focal length of the third lens and the fourth lens may have a positive value. Additionally, the synthetic focal length of the third lens and the fourth lens may be greater than the absolute value of the focal length of the second lens.

The optical imaging system according to an embodiment of the present disclosure may have a field of view greater than 78°. In an embodiment, a field of view of the optical imaging system may be greater than 78° and less than 87°.

Figure 2:
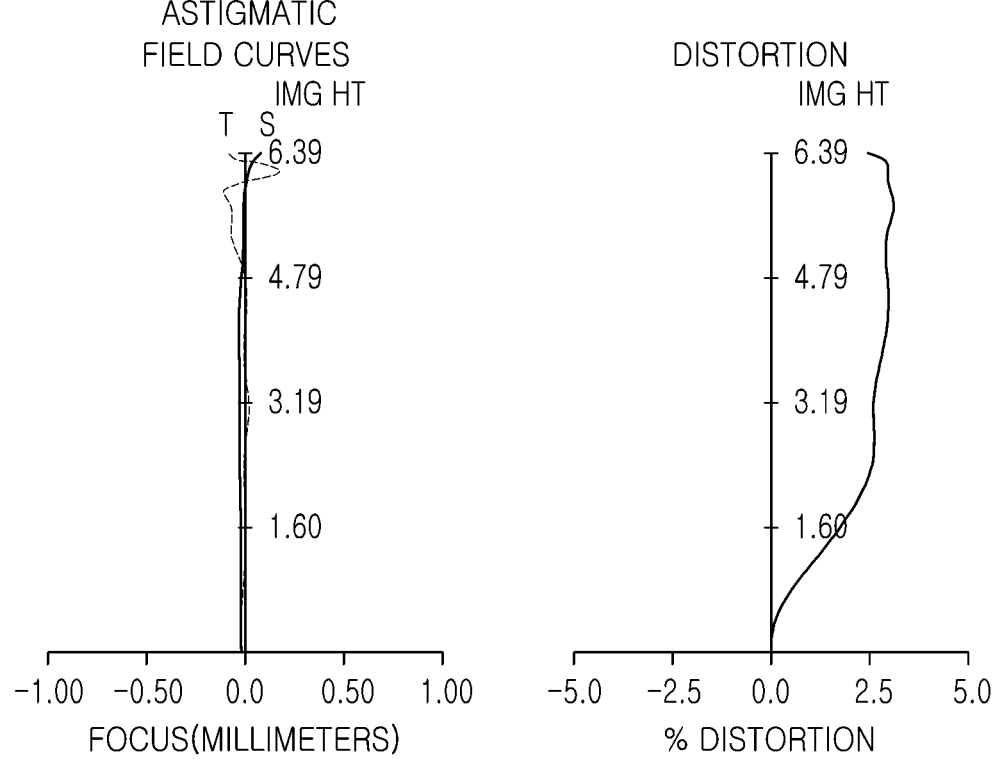
FIG. 2 is a view illustrating aberration characteristics of the optical imaging system illustrated in FIG. 1.

FIG. 1 illustrates a structural view of an optical imaging system according to a first embodiment of the present disclosure, and FIG. 2 is a view illustrating aberration characteristics of the optical imaging system illustrated in FIG. 1.

Referring to FIG. 1, an optical imaging system 100 according to the first embodiment of the present disclosure may include a first lens 101, a second lens 102, a third lens 103, a fourth lens 104, a fifth lens 105, a sixth lens 106, a seventh lens 107, an eighth lens 108, and a ninth lens 109, and may further include a filter 110 and an image sensor IS.

The optical imaging system 100 according to the first embodiment of the present disclosure may focus an image on an imaging surface 111. The imaging surface 111 may be a surface on which an image is focused by the optical imaging system. For example, the imaging surface 111 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 1.

TABLE 1

| Surface Number | Element | Radius of Curvature | Thickness or Distance | Refractive Index | Abbe Number | Focal Length |
|---|---|---|---|---|---|---|
| S1 | First | 3.043 | 1.159 | 1.544 | 55.99 | 7.0339 |
| S2 | Lens | 12.656 | 0.100 | | | |
| S3 | Second | 4.334 | 0.230 | 1.671 | 19.24 | −16 |
| S4 | Lens | 3.032 | 0.500 | | | |
| S5 | Third | 7.504 | 0.390 | 1.544 | 55.99 | −2999.9985 |
| S6 | Lens | 7.333 | 0.122 | | | |
| S7 | Fourth | 7.880 | 0.250 | 1.544 | 55.99 | 21.2142 |
| S8 | Lens | 24.339 | 0.507 | | | |
| S9 | Fifth | 1649.852 | 0.366 | 1.671 | 19.24 | −30.5111 |
| S10 | Lens | 20.455 | 0.125 | | | |
| S11 | Sixth | 29.176 | 0.364 | 1.544 | 55.99 | 32.3882 |
| S12 | Lens | −44.767 | 0.391 | | | |
| S13 | Seventh | 6.545 | 0.360 | 1.614 | 25.94 | −9.9393 |
| S14 | Lens | 3.107 | 0.168 | | | |
| S15 | Eighth | 2.173 | 0.600 | 1.567 | 37.40 | 5.1785 |
| S16 | Lens | 7.388 | 0.842 | | | |
| S17 | Ninth | 4.383 | 0.420 | 1.535 | 55.74 | −6.8478 |
| S18 | Lens | 1.933 | 0.326 | | | |
| S19 | Filter | Infinity | 0.210 | | | |
| S20 | | Infinity | 0.790 | | | |

10

TABLE 1-continued

| Surface Number | Element | Radius of Curvature | Thickness or Distance | Refractive Index | Abbe Number | Focal Length |
|---|---|---|---|---|---|---|
| S21 | Imaging Surface | Infinity | | | | |

The total focal length f of the optical imaging system 100 according to the first embodiment of the present disclosure is 6.6259 mm, the TTL is 8.220, the BFL is 1.326, the EPD is 4.4265 mm, the IMG HT is 6 mm, and the FOV is 81.833°.

In the first embodiment of the present disclosure, the first lens 101 has a positive refractive power, a first surface of the first lens 101 has a shape convex in the paraxial region, and a second surface of the first lens 101 has a shape concave in the paraxial region.

The second lens 102 has a negative refractive power, a first surface of the second lens 102 has a shape convex in the paraxial region, and a second surface of the second lens 102 has a shape concave in the paraxial region.

The third lens 103 has a negative refractive power, a first surface of the third lens 103 has a shape convex in the paraxial region, and a second surface of the third lens 103 has a shape concave in the paraxial region.

The fourth lens 104 has a positive refractive power, a first surface of the fourth lens 104 has a shape convex in the paraxial region, and a second surface of the fourth lens 104 has a shape concave in the paraxial region.

The fifth lens 105 has a negative refractive power, a first surface of the fifth lens 105 has a shape convex in the paraxial region, and a second surface of the fifth lens 105 has a shape concave in the paraxial region.

The sixth lens 106 has a positive refractive power, and a first surface and a second surface of the sixth lens 106 have a shape convex in the paraxial region.

The seventh lens 107 has a negative refractive power, a first surface of the seventh lens 107 has a shape convex in the paraxial region, and a second surface of the seventh lens 107 has a shape concave in the paraxial region.

The eighth lens 108 has a positive refractive power, a first surface of the eighth lens 108 has a shape convex in the paraxial region, and a second surface of the eighth lens 108 has a shape concave in the paraxial region.

The ninth lens 109 has a negative refractive power, a first surface of the ninth lens 109 has a shape convex in the paraxial region, and a second surface of the ninth lens 109 has a shape concave in the paraxial region.

Additionally, any one or any combination of any two or more of the sixth lens 106 to the ninth lens 109 has at least one inflection point formed on either one or both of the first and second surfaces.

Each surface of the first lens 101 to the ninth lens 109 has aspherical coefficients as illustrated in Table 2. For example, both an object-side surface and an image-side surface of the first lens 101 to the ninth lens 109 are aspherical surfaces.

TABLE 2

| | S1 | S2 | S3 | S4 | S5 | S6 |
|---|---|---|---|---|---|---|
| Conic Constant (K) | −0.701 | −9.585 | −11.481 | −4.073 | −24.200 | −90.753 |
| Fourth Coefficient (A) | 2.807E−03 | −1.902E−02 | −3.207E−02 | −1.871E−02 | −1.167E−02 | 1.732E−03 |
| Sixth Coefficient (B) | −6.304E−04 | 3.277E−02 | 4.658E−02 | 1.851E−02 | 1.437E−02 | −4.945E−02 |
| Eighth Coefficient (C) | 3.240E−03 | −4.118E−02 | −5.006E−02 | 5.126E−03 | −2.689E−02 | 1.874E−01 |
| Tenth Coefficient (D) | −5.460E−03 | 4.475E−02 | 4.974E−02 | −3.072E−02 | 4.622E−02 | −4.863E−01 |

TABLE 2-continued

| | | | | | | |
|---|---|---|---|---|---|---|
| Twelfth Coefficient (E) | 5.283E–03 | –4.087E–02 | –4.451E–02 | 3.784E–02 | –6.394E–02 | 8.463E–01 |
| Fourteenth Coefficient (F) | –3.248E–03 | 2.908E–02 | 3.165E–02 | –2.331E–02 | 6.482E–02 | –1.026E+00 |
| Sixteenth Coefficient (G) | 1.333E–03 | –1.546E–02 | –1.667E–02 | 3.587E–03 | –4.758E–02 | 8.874E–01 |
| Eighteenth Coefficient (H) | –3.736E–04 | 6.039E–03 | 6.351E–03 | 6.085E–03 | 2.533E–02 | –5.552E–01 |
| Twentieth Coefficient (J) | 7.170E–05 | –1.714E–03 | –1.730E–03 | –5.692E–03 | –9.772E–03 | 2.518E–01 |
| Twenty-second Coefficient (L) | –9.263E–06 | 3.481E–04 | 3.316E–04 | 2.558E–03 | 2.704E–03 | –8.193E–02 |
| Twenty-fourth Coefficient (M) | 7.712E–07 | –4.918E–05 | –4.338E–05 | –6.915E–04 | –5.231E–04 | 1.864E–02 |
| Twenty-sixth Coefficient (N) | –3.768E–08 | 4.582E–06 | 3.666E–06 | 1.140E–04 | 6.701E–05 | –2.815E–03 |
| Twenty-eight Coefficient (O) | 8.616E–10 | –2.528E–07 | –1.793E–07 | –1.059E–05 | –5.092E–06 | 2.533E–04 |
| Thirtieth Coefficient (P) | –3.135E–12 | 6.249E–09 | 3.832E–09 | 4.243E–07 | 1.731E–07 | –1.028E–05 |

| | S7 | S8 | S9 | S10 | S11 | S12 |
|---|---|---|---|---|---|---|
| Conic Constant (K) | –74.877 | 65.535 | 0.000 | 0.000 | 67.791 | 99.000 |
| Fourth Coefficient (A) | –1.684E–03 | –2.313E–03 | –1.681E–02 | –1.154E–02 | 2.506E–02 | 2.321E–02 |
| Sixth Coefficient (B) | –7.525E–03 | –4.735E–02 | –2.991E–02 | –1.923E–02 | –4.179E–02 | –2.966E–02 |
| Eighth Coefficient (C) | 1.060E–02 | 1.917E–01 | 1.093E–01 | 2.658E–02 | 2.091E–02 | 1.093E–02 |
| Tenth Coefficient (D) | –1.235E–02 | –4.776E–01 | –2.340E–01 | –2.341E–01 | 9.703E–03 | 4.334E–03 |
| Twelfth Coefficient (E) | 1.071E–03 | 7.816E–01 | 3.342E–01 | 1.612E–02 | –2.410E–02 | –8.136E–03 |
| Fourteenth Coefficient (F) | 1.439E–02 | –8.842E–01 | –3.343E–01 | –1.027E–02 | 1.917E–02 | 5.065E–03 |
| Sixteenth Coefficient (G) | –1.989E–02 | 7.108E–01 | 2.396E–01 | 6.042E–03 | –9.076E–03 | –1.868E–03 |
| Eighteenth Coefficient (H) | 1.425E–02 | –4.118E–01 | –1.242E–01 | –2.874E–03 | 2.856E–03 | 4.542E–04 |
| Twentieth Coefficient (J) | –6.358E–03 | 1.724E–01 | 4.660E–02 | 9.998E–04 | –6.195E–04 | –7.596E–05 |
| Twenty-second Coefficient (L) | 1.848E–03 | –5.166E–02 | –1.249E–02 | –2.421E–04 | 9.318E–05 | 8.936E–06 |
| Twenty-fourth Coefficient (M) | –3.470E–04 | 1.079E–02 | 2.330E–03 | 3.940E–05 | –9.552E–06 | –7.480E–07 |
| Twenty-sixth Coefficient (N) | 3.980E–05 | –1.491E–03 | –2.868E–04 | –4.091E–06 | 6.367E–07 | 4.395E–08 |
| Twenty-eighth Coefficient (O) | –2.414E–06 | 1.225E–04 | 2.091E–05 | 2.441E–07 | –2.487E–08 | –1.667E–09 |
| Thirtieth Coefficient (P) | 5.162E–08 | –4.524E–06 | –6.834E–07 | –6.345E–09 | 4.317E–10 | 3.075E–11 |

| | S13 | S14 | S15 | S16 | S17 | S18 |
|---|---|---|---|---|---|---|
| Conic Constant (K) | 0.000 | –23.470 | –8.096 | –99.000 | –32.421 | –6.868 |
| Fourth Coefficient (A) | –4.517E–02 | –7.362E–02 | –9.078E–05 | 6.394E–02 | –8.130E–02 | –4.800E–02 |
| Sixth Coefficient (B) | 5.065E–02 | 5.907E–02 | 1.313E–03 | –3.548E–02 | 2.008E–02 | 1.108E–02 |
| Eighth Coefficient (C) | –4.388E–02 | –3.936E–02 | –7.238E–03 | 1.264E–02 | –2.406E–03 | –1.281E–03 |
| Tenth Coefficient (D) | 2.731E–02 | 2.098E–02 | 4.985E–03 | –3.829E–03 | –1.330E–05 | –8.090E–05 |
| Twelfth Coefficient (E) | –1.227E–02 | –8.307E–03 | –2.161E–03 | 9.000E–04 | 5.672E–05 | 4.870E–05 |
| Fourteenth Coefficient (F) | 3.996E–03 | 2.345E–03 | 6.254E–04 | –1.543E–04 | –1.041E–05 | –7.238E–06 |
| Sixteenth Coefficient (G) | –9.624E–04 | –4.699E–04 | –1.238E–04 | 1.893E–05 | 1.075E–06 | 5.882E–07 |
| Eighteenth Coefficient (H) | 1.749E–04 | 6.688E–05 | 1.718E–05 | –1.659E–06 | –7.372E–08 | –2.901E–08 |
| Twentieth Coefficient (J) | –2.424E–05 | –6.702E–06 | –1.688E–06 | 1.035E–07 | 3.514E–09 | 8.484E–10 |
| Twenty-second Coefficient (L) | 2.543E–06 | 4.629E–07 | 1.167E–07 | –4.556E–09 | –1.173E–10 | –1.155E–11 |
| Twenty-fourth Coefficient (M) | –1.956E–07 | –2.113E–08 | –5.536E–09 | 1.381E–10 | 2.694E–12 | –8.270E–14 |

TABLE 2-continued

| | | | | | |
|---|---|---|---|---|---|
| Twenty-sixth Coefficient (N) | 1.032E−08 | 5.880E−10 | 1.709E−10 | −2.744E−12 | −4.053E−14 | 5.834E−15 |
| Twenty-eighth Coefficient (O) | −3.305E−10 | −8.369E−12 | −3.083E−12 | 3.217E−14 | 3.596E−16 | −8.672E−17 |
| Thirtieth Coefficient (P) | 4.799E−12 | 3.571E−14 | 2.456E−14 | −1.686E−16 | −1.426E−18 | 4.611E−19 |

Additionally, the optical imaging system described above may have the aberration characteristics illustrated in FIG. 2.

Figure 3:
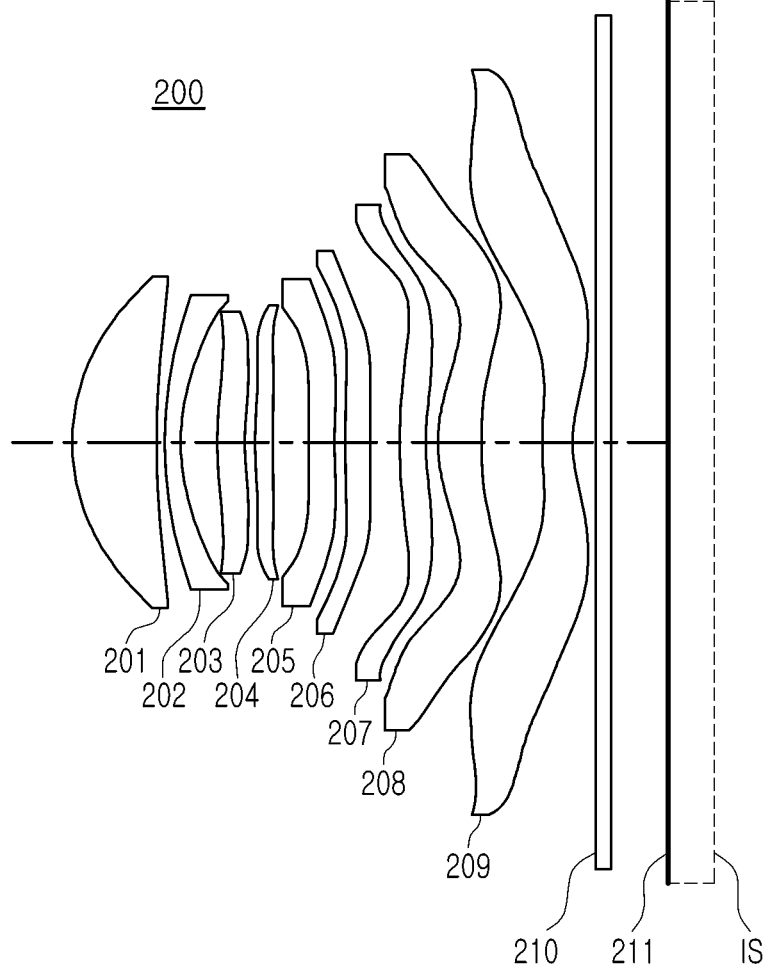
FIG. 3 illustrates a structural view of an optical imaging system according to a second embodiment of the present disclosure.
Figure 4:
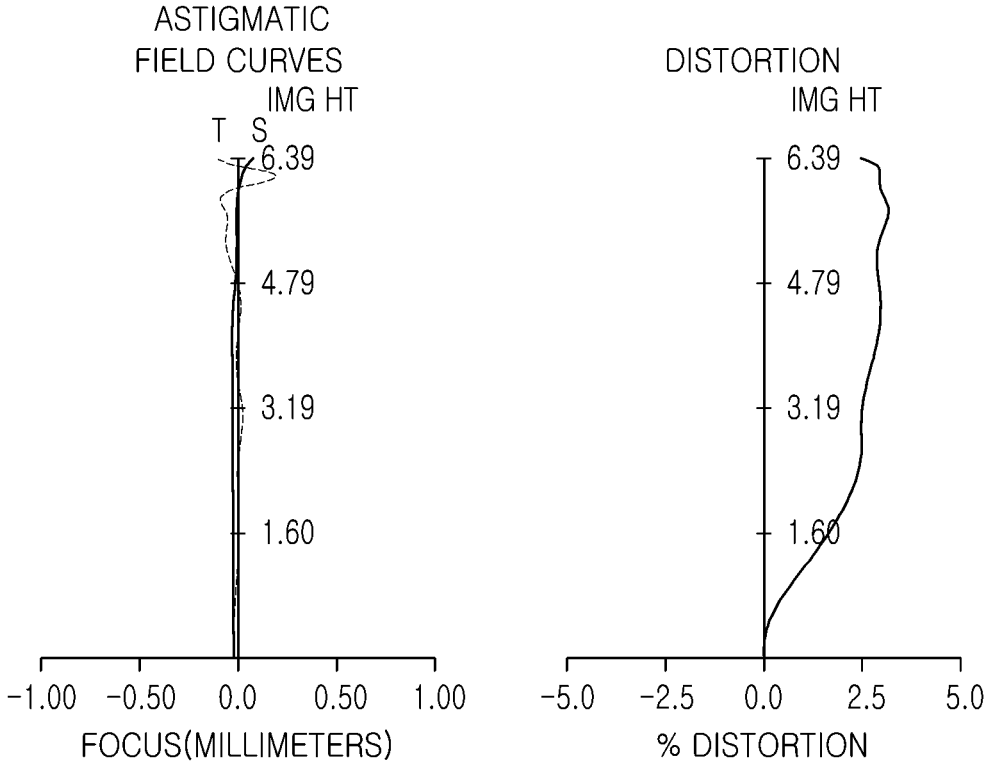
FIG. 4 is a view illustrating aberration characteristics of the optical imaging system illustrated in FIG. 3.

FIG. 3 illustrates a structural view of an optical imaging system according to a second embodiment of the present disclosure, and FIG. 4 is a view illustrating aberration characteristics of the optical imaging system illustrated in FIG. 3.

Referring to FIG. 3, an optical imaging system 200 according to the second embodiment of the present disclosure may include a first lens 201, a second lens 202, a third lens 203, a fourth lens 204, a fifth lens 205, a sixth lens 206, a seventh lens 207, an eighth lens 208, and a ninth lens 209, and may further include a filter 210 and an image sensor IS.

The optical imaging system 200 according to the second embodiment of the present disclosure may focus an image on an imaging surface 211. The imaging surface 211 may be a surface on which an image is focused by the optical imaging system. For example, the imaging surface 211 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 3.

TABLE 3

| Surface Number | Element | Radius of Curvature | Thickness or Distance | Refractive Index | Abbe Number | Focal Length |
|---|---|---|---|---|---|---|
| S1 | First | 3.038 | 1.165 | 1.544 | 55.99 | 7.0320 |
| S2 | Lens | 12.561 | 0.100 | | | |
| S3 | Second | 4.217 | 0.230 | 1.671 | 19.24 | −16 |
| S4 | Lens | 2.971 | 0.508 | | | |
| S5 | Third | 7.445 | 0.390 | 1.544 | 55.99 | −2999.9795 |
| S6 | Lens | 7.274 | 0.127 | | | |
| S7 | Fourth | 7.802 | 0.250 | 1.544 | 55.99 | 21.0223 |
| S8 | Lens | 24.050 | 0.507 | | | |
| S9 | Fifth | 619.633 | 0.355 | 1.671 | 19.24 | −30.8306 |
| S10 | Lens | 20.242 | 0.132 | | | |
| S11 | Sixth | 28.753 | 0.356 | 1.544 | 55.99 | 33.4864 |
| S12 | Lens | −50.077 | 0.396 | | | |
| S13 | Seventh | 6.526 | 0.360 | 1.614 | 25.94 | −10.3715 |
| S14 | Lens | 3.171 | 0.168 | | | |
| S15 | Eighth | 2.191 | 0.600 | 1.567 | 37.40 | 5.3240 |
| S16 | Lens | 7.076 | 0.840 | | | |
| S17 | Ninth | 4.692 | 0.420 | 1.535 | 55.74 | −6.8154 |
| S18 | Lens | 1.992 | 0.315 | | | |
| S19 | Filter | Infinity | 0.210 | | | |
| S20 | | Infinity | 0.790 | | | |
| S21 | Imaging Surface | Infinity | | | | |

The total focal length f of the optical imaging system 200 according to the second embodiment of the present disclosure is 6.6566 mm, the TTL is 8.220, the BFL is 1.315, the EPD is 4.4391 mm, the IMG HT is 6 mm, and the FOV is 81.562°.

In the second embodiment of the present disclosure, the first lens 201 has a positive refractive power, a first surface of the first lens 201 has a shape convex in the paraxial region, and a second surface of the first lens 201 has a shape concave in the paraxial region.

The second lens 202 has a negative refractive power, a first surface of the second lens 202 has a shape convex in the paraxial region, and a second surface of the second lens 202 has a shape concave in the paraxial region.

The third lens 203 has a negative refractive power, a first surface of the third lens 203 has a shape convex in the paraxial region, and a second surface of the third lens 203 has a shape concave in the paraxial region.

The fourth lens 204 has a positive refractive power, a first surface of the fourth lens 204 has a shape convex in the paraxial region, and a second surface of the fourth lens 204 has a shape concave in the paraxial region.

The fifth lens 205 has a negative refractive power, a first surface of the fifth lens 205 has a shape convex in the paraxial region, and a second surface of the fifth lens 205 has a shape concave in the paraxial region.

The sixth lens 206 has a positive refractive power, and a first surface and a second surface of the sixth lens 206 have a shape convex in the paraxial region.

The seventh lens 207 has a negative refractive power, a first surface of the seventh lens 207 has a shape convex in the paraxial region, and a second surface of the seventh lens 207 has a shape concave in the paraxial region.

The eighth lens 208 has a positive refractive power, a first surface of the eighth lens 208 has a shape convex in the paraxial region, and a second surface of the eighth lens 208 has a shape concave in the paraxial region.

The ninth lens 209 has a negative refractive power, a first surface of the ninth lens 209 has a shape convex in the paraxial region, and a second surface of the ninth lens 209 has a shape concave in the paraxial region.

Additionally, any one or any combination of any two or more of the sixth lens 206 to the ninth lens 209 has at least one inflection point formed on either one or both of the first and second surfaces.

Each surface of the first lens 201 to the ninth lens 209 has aspherical coefficients as illustrated in Table 4. For example, both an object-side surface and an image-side surface of the first to ninth lenses 201 to 209 are aspherical surfaces.

TABLE 4

| | S1 | S2 | S3 | S4 | S5 | S6 |
|---|---|---|---|---|---|---|
| Conic Constant (K) | −0.703 | −10.259 | −11.498 | −4.076 | −24.058 | −88.092 |
| Fourth Coefficient (A) | 2.819E−03 | −1.828E−02 | −2.893E−02 | −1.655E−02 | −1.148E−02 | 1.508E−03 |

TABLE 4-continued

| | | | | | | |
|---|---|---|---|---|---|---|
| Sixth Coefficient (B) | −8.517E−04 | 3.121E−02 | 3.574E−02 | 8.005E−03 | 1.446E−02 | −4.812E−02 |
| Eighth Coefficient (C) | 4.093E−03 | −4.259E−02 | −2.902E−02 | 3.504E−02 | −2.527E−02 | 1.845E−01 |
| Tenth Coefficient (D) | −6.908E−03 | 5.303E−02 | 2.417E−02 | −8.667E−02 | 3.801E−02 | −4.826E−01 |
| Twelfth Coefficient (E) | 6.660E−03 | −5.379E−02 | −2.362E−02 | 1.121E−01 | −4.620E−02 | 8.430E−01 |
| Fourteenth Coefficient (F) | −4.071E−03 | 4.052E−02 | 1.960E−02 | −9.583E−02 | 4.250E−02 | −1.024E+00 |
| Sixteenth Coefficient (G) | 1.662E−03 | −2.210E−02 | −1.163E−02 | 5.612E−02 | −2.940E−02 | 8.868E−01 |
| Eighteenth Coefficient (H) | −4.638E−04 | 8.695E−03 | 4.806E−03 | −2.209E−02 | 1.527E−02 | −5.554E−01 |
| Twentieth Coefficient (J) | 8.885E−05 | −2.463E−03 | −1.384E−03 | 5.397E−03 | −5.910E−03 | 2.521E−01 |
| Twenty-second Coefficient (L) | −1.151E−05 | 4.969E−04 | 2.755E−04 | −5.902E−04 | 1.675E−03 | −8.217E−02 |
| Twenty-fourth Coefficient (M) | 9.672E−07 | −6.957E−05 | −3.703E−05 | −6.602E−05 | −3.366E−04 | 1.873E−02 |
| Twenty-sixth Coefficient (N) | −4.848E−08 | 6.416E−06 | 3.192E−06 | 3.174E−05 | 4.511E−05 | −2.834E−03 |
| Twenty-eighth Coefficient (O) | 1.193E−09 | −3.504E−07 | −1.586E−07 | −4.155E−06 | −3.591E−06 | 2.557E−04 |
| Thirtieth Coefficient (P) | −7.311E−12 | 8.575E−09 | 3.433E−09 | 1.986E−07 | 1.275E−07 | −1.041E−05 |

| | S7 | S8 | S9 | S10 | S11 | S12 |
|---|---|---|---|---|---|---|
| Conic Constant (K) | −71.667 | 73.243 | 0.000 | 0.000 | 76.393 | 72.929 |
| Fourth Coefficient (A) | −1.541E−03 | −5.863E−04 | −1.505E−02 | −1.108E−02 | 2.476E−02 | 2.183E−02 |
| Sixth Coefficient (B) | −7.410E−03 | −5.738E−02 | −3.658E−02 | −1.797E−02 | −3.886E−02 | −2.664E−02 |
| Eighth Coefficient (C) | 1.021E−02 | 2.282E−01 | 1.238E−01 | 1.499E−02 | 1.339E−02 | 7.598E−03 |
| Tenth Coefficient (D) | −1.182E−02 | −5.622E−01 | −2.568E−01 | 4.099E−03 | 1.981E−02 | 6.491E−03 |
| Twelfth Coefficient (E) | 1.189E−04 | 9.118E−01 | 3.616E−01 | −2.102E−02 | −3.267E−02 | −8.662E−03 |
| Fourteenth Coefficient (F) | 1.585E−02 | −1.022E+00 | −3.590E−01 | 2.265E−02 | 2.405E−02 | 4.747E−03 |
| Sixteenth Coefficient (G) | −2.140E−02 | 8.138E−01 | 2.562E−01 | −1.423E−02 | −1.100E−02 | −1.517E−03 |
| Eighteenth Coefficient (H) | 1.533E−02 | −4.670E−01 | −1.325E−01 | 6.022E−03 | 3.392E−03 | 2.951E−04 |
| Twentieth Coefficient (J) | −6.900E−03 | 1.936E−01 | 4.956E−02 | −1.808E−03 | −7.251E−04 | −3.237E−05 |
| Twenty-second Coefficient (L) | 2.040E−03 | −5.744E−02 | −1.325E−02 | 3.907E−04 | 1.078E−04 | 1.147E−06 |
| Twenty-fourth Coefficient (M) | −3.945E−04 | 1.188E−02 | 2.463E−03 | −6.005E−05 | −1.096E−05 | 1.664E−07 |
| Twenty-sixth Coefficient (N) | 4.748E−05 | −1.627E−03 | −3.021E−04 | 6.262E−06 | 7.247E−07 | −2.417E−08 |
| Twenty-eighth Coefficient (O) | −3.147E−06 | 1.324E−04 | 2.194E−05 | −3.972E−07 | −2.812E−08 | 1.255E−09 |
| Thirtieth Coefficient (P) | 8.267E−08 | −4.853E−06 | −7.141E−07 | 1.154E−08 | 4.855E−10 | −2.421E−11 |

| | S13 | S14 | S15 | S16 | S17 | S18 |
|---|---|---|---|---|---|---|
| Conic Constant (K) | 0.000 | −22.748 | −7.969 | −99.000 | −32.979 | −6.881 |
| Fourth Coefficient (A) | −4.490E−02 | −7.279E−02 | 2.932E−03 | 6.892E−02 | −8.183E−02 | −4.935E−02 |
| Sixth Coefficient (B) | 5.114E−02 | 5.780E−02 | −3.628E−03 | −4.153E−02 | 1.979E−02 | 1.138E−02 |
| Eighth Coefficient (C) | −4.505E−02 | −3.817E−02 | −3.687E−03 | 1.610E−02 | −2.013E−03 | −1.264E−03 |
| Tenth Coefficient (D) | 2.840E−02 | 2.013E−02 | 3.262E−03 | −5.023E−03 | −1.487E−04 | −1.012E−04 |
| Twelfth Coefficient (E) | −1.285E−02 | −7.844E−03 | −1.522E−03 | 1.174E−03 | 8.167E−05 | 5.318E−05 |
| Fourteenth Coefficient (F) | 4.188E−03 | 2.162E−03 | 4.422E−04 | −1.981E−04 | −1.334E−05 | −7.751E−06 |
| Sixteenth Coefficient (G) | −1.006E−03 | −4.200E−04 | −8.461E−05 | 2.390E−05 | 1.311E−06 | 6.204E−07 |
| Eighteenth Coefficient (H) | 1.818E−04 | 5.751E−05 | 1.110E−05 | −2.063E−06 | −8.709E−08 | −2.985E−08 |

TABLE 4-continued

| | | | | | | |
|---|---|---|---|---|---|---|
| Twentieth Coefficient (J) | -2.494E-05 | -5.492E-06 | -1.017E-06 | 1.272E-07 | 4.056E-09 | 8.218E-10 |
| Twenty-second Coefficient (L) | 2.582E-06 | 3.557E-07 | 6.471E-08 | -5.540E-09 | -1.328E-10 | -8.413E-12 |
| Twenty-fourth Coefficient (M) | -1.953E-07 | -1.474E-08 | -2.783E-09 | 1.665E-10 | 2.999E-12 | -2.054E-13 |
| Twenty-sixth Coefficient (N) | 1.012E-08 | 3.430E-10 | 7.614E-11 | -3.283E-12 | -4.444E-14 | 8.409E-15 |
| Twenty-eighth Coefficient (O) | -3.182E-10 | -2.919E-12 | -1.171E-12 | 3.823E-14 | 3.887E-16 | -1.157E-16 |
| Thirtieth Coefficient (P) | 4.537E-12 | -1.771E-14 | 7.401E-15 | -1.993E-16 | -1.520E-18 | 5.984E-19 |

Additionally, the optical imaging system described above may have the aberration characteristics illustrated in FIG. 4.

Figure 5:
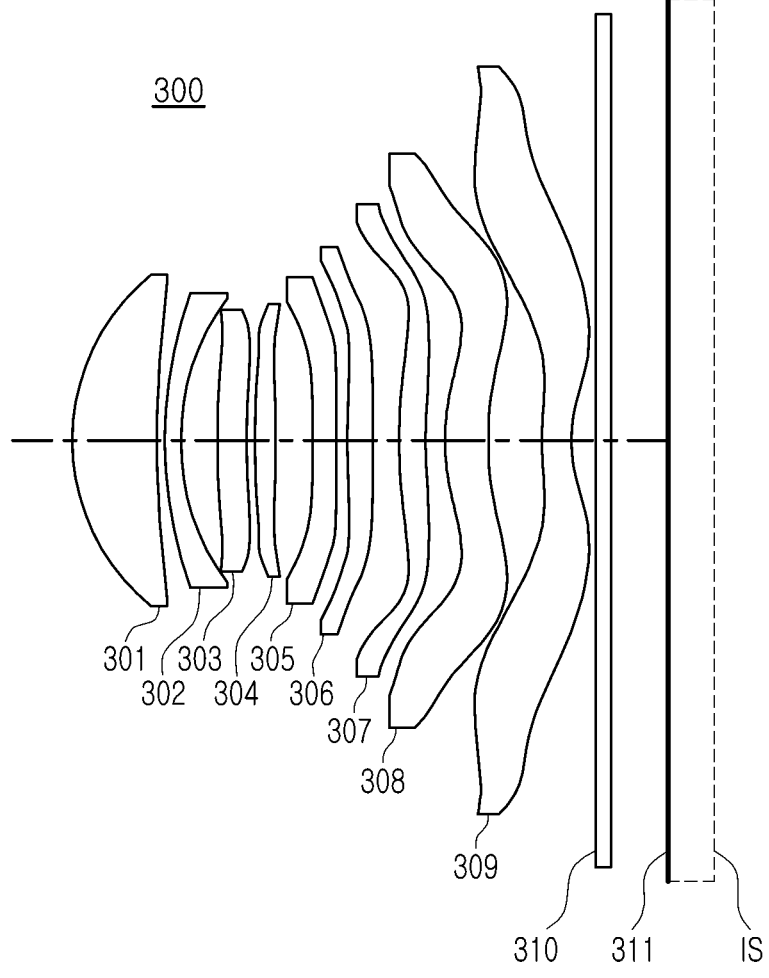
FIG. 5 illustrates a structural view of an optical imaging system according to a third embodiment of the present disclosure.
Figure 6:
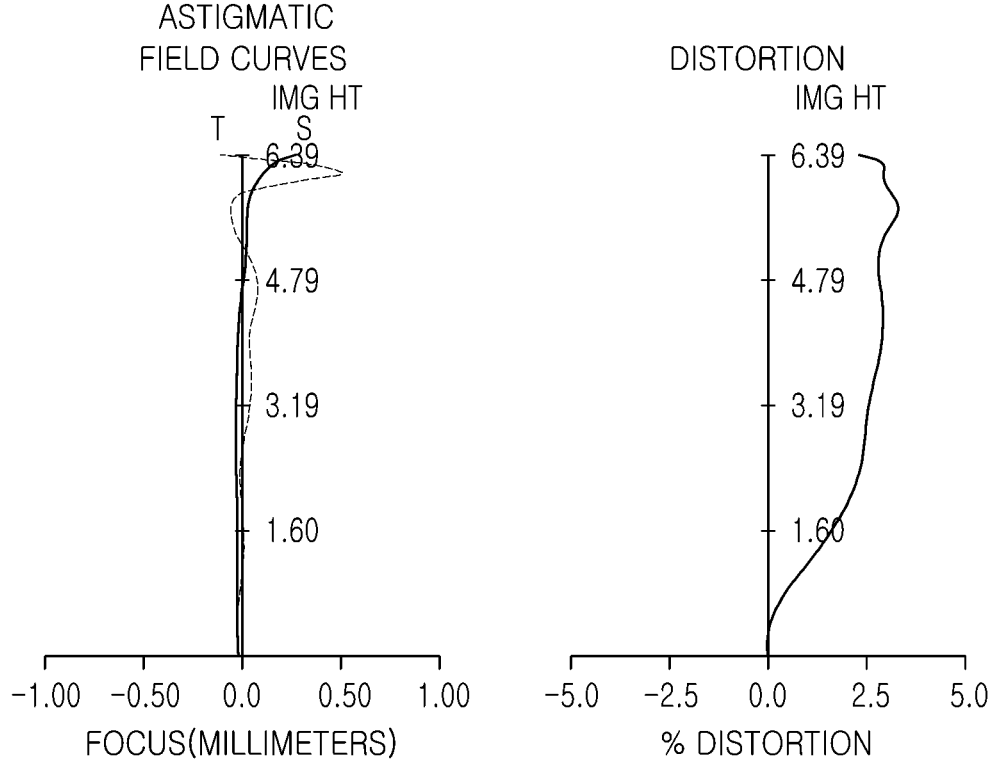
FIG. 6 is a view illustrating aberration characteristics of the optical imaging system illustrated in FIG. 5.

FIG. 5 illustrates a structural view of an optical imaging system according to a third embodiment of the present disclosure, and FIG. 6 is a view illustrating aberration characteristics of the optical imaging system illustrated in FIG. 5.

Referring to FIG. 5, an optical imaging system 300 according to the third embodiment of the present disclosure may include a first lens 301, a second lens 302, a third lens 303, a fourth lens 304, a fifth lens 305, a sixth lens 306, a seventh lens 307, an eighth lens 308, and a ninth lens 309, and may further include a filter 310 and an image sensor IS.

The optical imaging system 300 according to the third embodiment of the present disclosure may focus an image on an imaging surface 311. The imaging surface 311 may be a surface in which an image is focused by the optical imaging system. For example, the imaging surface 311 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 5.

TABLE 5

| Surface Number | Element | Radius of Curvature | Thickness or Distance | Refractive Index | Abbe Number | Focal Length |
|---|---|---|---|---|---|---|
| S1 | First | 3.060 | 1.162 | 1.544 | 55.99 | 7.0099 |
| S2 | Lens | 13.179 | 0.100 | | | |
| S3 | Second | 4.304 | 0.230 | 1.671 | 19.24 | -16.5120 |
| S4 | Lens | 3.043 | 0.504 | | | |
| S5 | Third | 7.557 | 0.390 | 1.544 | 55.99 | -48.2447 |
| S6 | Lens | 5.766 | 0.135 | | | |
| S7 | Fourth | 6.095 | 0.281 | 1.544 | 55.99 | 14.6635 |
| S8 | Lens | 25.077 | 0.509 | | | |
| S9 | Fifth | 457.411 | 0.347 | 1.671 | 19.24 | -27.5724 |
| S10 | Lens | 17.977 | 0.132 | | | |
| S11 | Sixth | 27.710 | 0.353 | 1.544 | 55.99 | 40.1664 |
| S12 | Lens | -104.980 | 0.360 | | | |
| S13 | Seventh | 6.221 | 0.366 | 1.614 | 25.94 | 7807.0357 |
| S14 | Lens | 6.088 | 0.268 | | | |
| S15 | Eighth | 3.360 | 0.600 | 1.567 | 37.40 | 10.7461 |
| S16 | Lens | 6.950 | 0.737 | | | |
| S17 | Ninth | 4.484 | 0.420 | 1.535 | 55.74 | -6.9538 |
| S18 | Lens | 1.971 | 0.323 | | | |
| S19 | Filter | Infinity | 0.210 | | | |
| S20 | | Infinity | 0.790 | | | |
| S21 | Imaging Surface | Infinity | | | | |

The total focal length f of the optical imaging system 300 according to the third embodiment of the present disclosure is 6.6443 mm, the TTL is 8.217, the BFL is 1.323, the EPD is 4.431 mm, the IMG HT is 6 mm, and the FOV is 81.623°.

In the third embodiment of the present disclosure, the first lens 301 has a positive refractive power, a first surface of the first lens 301 has a shape convex in the paraxial region, and a second surface of the first lens 301 has a shape concave in the paraxial region.

The second lens 302 has a negative refractive power, the first surface of the second lens 302 has a shape convex in the paraxial region, and the second surface of the second lens 302 has a shape concave in the paraxial region.

The third lens 303 has a negative refractive power, the first surface of the third lens 303 has a shape convex in the paraxial region, and the second surface of the third lens 303 has a shape concave in the paraxial region.

The fourth lens 304 has a positive refractive power, a first surface of the fourth lens 304 has a shape convex in the paraxial region, and a second surface of the fourth lens 304 has a shape concave in the paraxial region.

The fifth lens 305 has a negative refractive power, the first surface of the fifth lens 305 has a shape convex in the paraxial region, and the second surface of the fifth lens 305 has a shape concave in the paraxial region.

The sixth lens 306 has a positive refractive power, and a first surface and a second surface of the sixth lens 306 have a shape convex in the paraxial region.

The seventh lens 307 has a positive refractive power, a first surface of the seventh lens 307 has a shape convex in the paraxial region, and a second surface of the seventh lens 307 has a shape concave in the paraxial region.

The eighth lens 308 has a positive refractive power, a first surface of the eighth lens 308 has a shape convex in the paraxial region, and a second surface of the eighth lens 308 has a shape concave in the paraxial region.

The ninth lens 309 has a negative refractive power, a first surface of the ninth lens 309 has a shape convex in the paraxial region, and a second surface of the ninth lens 309 has a shape concave in the paraxial region.

In addition, any one or any combination of any two or more of the sixth lens 306 to the ninth lens 309 has at least one inflection point formed on either one or both of the first and second surfaces.

Each surface of the first lens 301 to the ninth lens 309 has aspherical coefficients as illustrated in Table 6. For example, both an object-side surface and an image-side surface of the first lens 301 to the ninth lens 309 are aspherical surfaces.

TABLE 6

| | S1 | S2 | S3 | S4 | S5 | S6 |
|---|---|---|---|---|---|---|
| Conic Constant (K) | −0.713 | −11.602 | −11.514 | −4.062 | −25.661 | −85.813 |
| Fourth Coefficient (A) | 3.097E−03 | −2.853E−02 | −4.714E−02 | −3.057E−02 | −2.634E−02 | 1.072E−03 |
| Sixth Coefficient (B) | −3.588E−03 | 6.010E−02 | 1.021E−01 | 6.412E−02 | 5.218E−02 | −4.535E−02 |
| Eighth Coefficient (C) | 9.745E−03 | −8.330E−02 | −1.456E−01 | −6.810E−02 | −9.195E−02 | 1.746E−01 |
| Tenth Coefficient (D) | −1.370E−02 | 8.846E−02 | 1.625E−01 | 3.386E−02 | 1.149E−01 | −4.596E−01 |
| Twelfth Coefficient (E) | 1.200E−02 | −7.317E−02 | −1.427E−01 | 1.936E−02 | −9.612E−02 | 8.058E−01 |
| Fourteenth Coefficient (F) | −6.957E−03 | 4.624E−02 | 9.463E−02 | −5.165E−02 | 5.077E−02 | −9.778E−01 |
| Sixteenth Coefficient (G) | 2.765E−03 | −2.204E−02 | −4.627E−02 | 4.624E−02 | −1.476E−02 | 8.436E−01 |
| Eighteenth Coefficient (H) | −7.667E−04 | 7.858E−03 | 1.654E−02 | −2.377E−02 | 5.597E−04 | −5.252E−01 |
| Twentieth Coefficient (J) | 1.487E−04 | −2.076E−03 | −4.283E−03 | 7.402E−03 | 1.298E−03 | 2.368E−01 |
| Twenty-second Coefficient (L) | −1.996E−05 | 3.993E−04 | 7.915E−04 | −1.269E−03 | −5.185E−04 | −7.662E−02 |
| Twenty-fourth Coefficient (M) | 1.800E−06 | −5.423E−05 | −1.014E−04 | 5.560E−05 | 9.558E−05 | 1.733E−02 |
| Twenty-sixth Coefficient (N) | −1.030E−07 | 4.916E−06 | 8.518E−06 | 2.028E−05 | −8.657E−06 | −2.603E−03 |
| Twenty-eighth Coefficient( O) | 3.325E−09 | −2.665E−07 | −4.216E−07 | −3.739E−06 | 2.577E−07 | 2.330E−04 |
| Thirtieth Coefficient (P) | −4.508E−11 | 6.522E−09 | 9.293E−09 | 2.028E−07 | 6.599E−09 | −9.409E−06 |

| | S7 | S8 | S9 | S10 | S11 | S12 |
|---|---|---|---|---|---|---|
| Conic Constant (K) | −66.696 | 67.477 | 0.000 | 0.000 | 72.955 | 20.748 |
| Fourth Coefficient (A) | −1.108E−03 | −1.107E−03 | −7.992E−03 | 5.361E−03 | 2.936E−02 | −4.088E−04 |
| Sixth Coefficient (B) | −7.614E−03 | −6.757E−02 | −7.566E−02 | −8.246E−02 | −3.432E−02 | 3.100E−02 |
| Eighth Coefficient (C) | 9.901E−03 | 2.689E−01 | 2.130E−01 | 1.481E−01 | −9.291E−03 | −8.309E−02 |
| Tenth Coefficient (D) | −1.128E−02 | −6.512E−01 | −3.838E−01 | −1.855E−01 | 5.310E−02 | 1.012E−01 |
| Twelfth Coefficient (E) | −3.565E−04 | 1.038E+00 | 4.879E−01 | 1.731E−01 | −6.046E−02 | −7.642E−02 |
| Fourteenth Coefficient (F) | 1.614E−02 | −1.146E+00 | −4.501E−01 | −1.212E−01 | 3.920E−02 | 3.884E−02 |
| Sixteenth Coefficient (G) | −2.156E−02 | 9.003E−01 | 3.047E−01 | 6.336E−02 | −1.670E−02 | −1.381E−02 |
| Eighteenth Coefficient (H) | 1.543E−02 | −5.111E−01 | −1.516E−01 | −2.448E−02 | 4.910E−03 | 3.497E−03 |
| Twentieth Coefficient (J) | −6.973E−03 | 2.101E−01 | 5.511E−02 | 6.901E−03 | −1.014E−03 | −6.348E−04 |
| Twenty-second Coefficient (L) | 2.078E−03 | −6.194E−02 | −1.442E−02 | −1.391E−03 | 1.467E−04 | 8.203E−05 |
| Twenty-fourth Coefficient (M) | −4.075E−04 | 1.275E−02 | 2.634E−03 | 1.938E−04 | −1.457E−05 | −7.375E−06 |
| Twenty-sixth Coefficient (N) | 5.023E−05 | −1.741E−03 | −3.184E−04 | −1.762E−05 | 9.457E−07 | 4.391E−07 |
| Twenty-eighth Coefficient (O) | −3.475E−06 | 1.414E−04 | 2.283E−05 | 9.342E−07 | −3.611E−08 | −1.558E−08 |
| Thirtieth Coefficient (P) | 9.958E−08 | −5.174E−06 | −7.343E−07 | −2.170E−08 | 6.146E−10 | 2.498E−10 |

| | S13 | S14 | S15 | S16 | S17 | S18 |
|---|---|---|---|---|---|---|
| Conic Constant (K) | 0.000 | −17.522 | −7.425 | −99.000 | −27.653 | −6.650 |
| Fourth Coefficient (A) | −4.483E−02 | −5.407E−02 | 2.324E−02 | 8.020E−02 | −6.661E−02 | −4.186E−02 |
| Sixth Coefficient (B) | 5.607E−02 | 4.000E−02 | −3.027E−02 | −5.451E−02 | 9.792E−03 | 5.562E−03 |
| Eighth Coefficient (C) | −5.909E−02 | −3.015E−02 | 1.414E−02 | 2.197E−02 | 1.187E−03 | 8.389E−04 |
| Tenth Coefficient (D) | 4.419E−02 | 1.865E−02 | −5.477E−03 | −6.490E−03 | −7.740E−04 | −5.917E−04 |
| Twelfth Coefficient (E) | −2.326E−02 | −8.108E−03 | 1.777E−03 | 1.402E−03 | 1.634E−04 | 1.345E−04 |

TABLE 6-continued

| | | | | | |
|---|---|---|---|---|---|
| Fourteenth Coefficient (F) | 8.760E−03 | 2.403E−03 | −4.787E−04 | −2.205E−04 | −2.082E−05 | −1.752E−05 |
| Sixteenth Coefficient (G) | −2.417E−03 | −4.934E−04 | 1.004E−04 | 2.516E−05 | 1.802E−06 | 1.470E−06 |
| Eighteenth Coefficient (H) | 4.949E−04 | 7.117E−05 | −1.547E−05 | −2.075E−06 | −1.104E−07 | −8.326E−08 |
| Twentieth Coefficient (J) | −7.521E−05 | −7.213E−06 | 1.700E−06 | 1.229E−07 | 4.846E−09 | 3.242E−09 |
| Twenty-second Coefficient (L) | 8.361E−06 | 5.066E−07 | −1.311E−07 | −5.164E−09 | −1.515E−10 | −8.650E−11 |
| Twenty-fourth Coefficient (M) | −6.583E−07 | −2.384E−08 | 6.932E−09 | 1.499E−10 | 3.293E−12 | 1.541E−12 |
| Twenty-sixth Coefficient (N) | 3.463E−08 | 7.043E−10 | −2.393E−10 | −2.859E−12 | −4.720E−14 | −1.731E−14 |
| Twenty-eighth Coefficient (O) | −1.087E−09 | −1.143E−11 | 4.862E−12 | 3.220E−14 | 4.009E−16 | 1.084E−16 |
| Thirtieth Coefficient (P) | 1.533E−11 | 7.238E−14 | −4.413E−14 | −1.624E−16 | −1.526E−18 | −2.766E−19 |

Additionally, the optical imaging system described above may have the aberration characteristics illustrated in FIG. 6.

Figure 7:
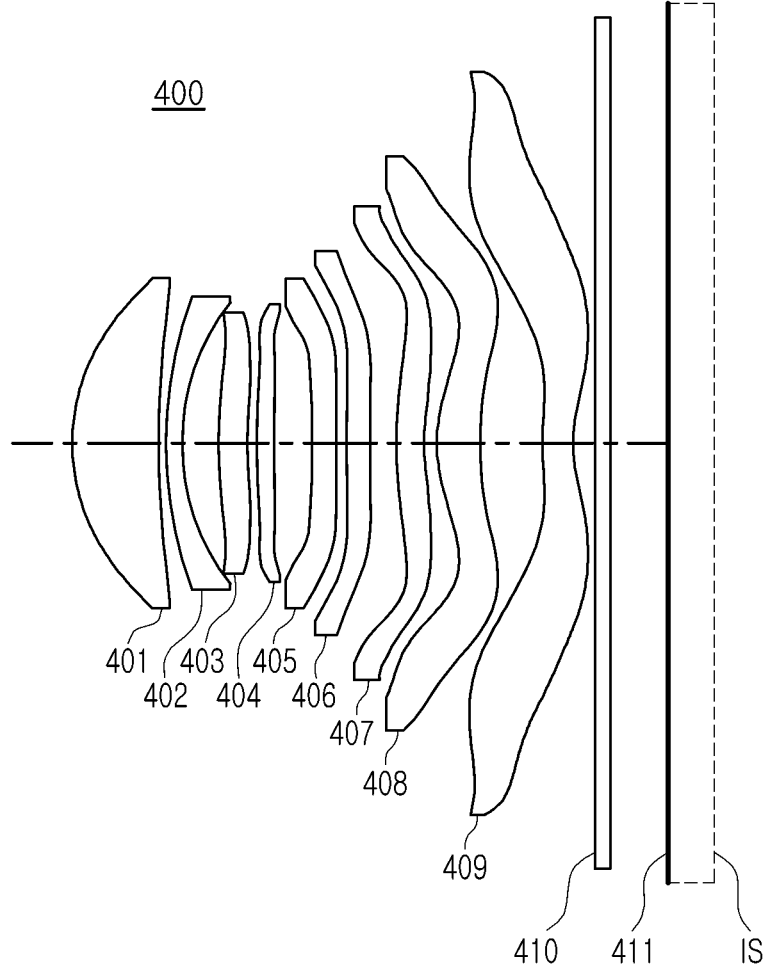
FIG. 7 illustrates a structural view of an optical imaging system according to a fourth embodiment of the present disclosure.
Figure 8:
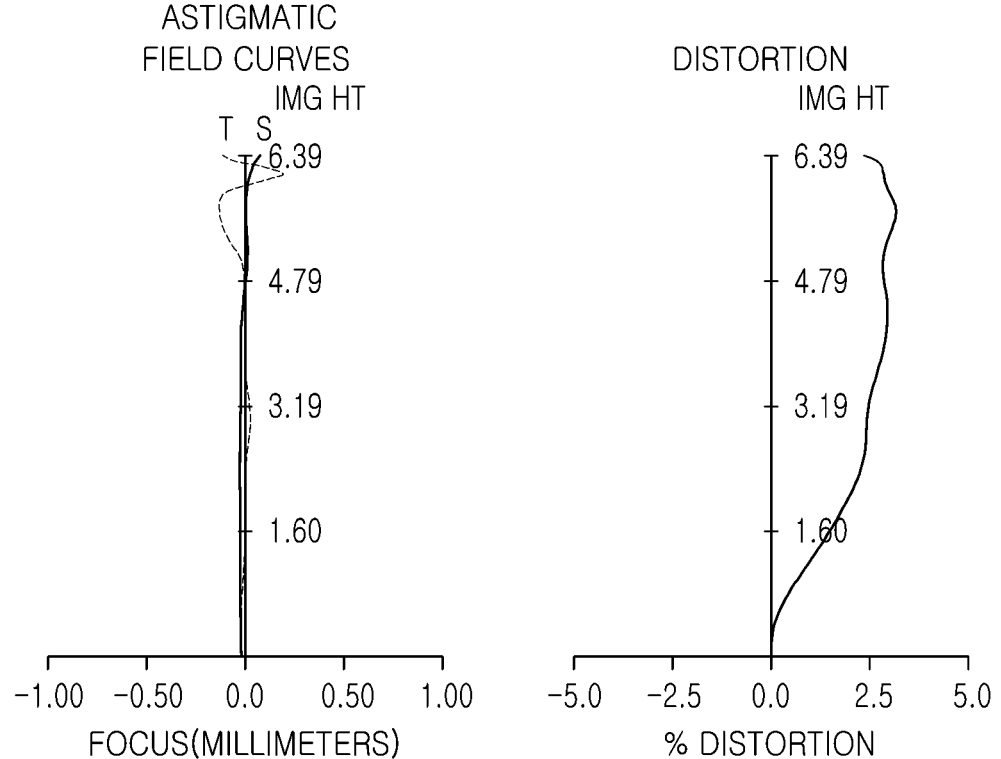
FIG. 8 is a view illustrating aberration characteristics of the optical imaging system illustrated in FIG. 7.

FIG. 7 illustrates a structural view of an optical imaging system according to a fourth embodiment of the present disclosure, and FIG. 8 is a view illustrating aberration characteristics of the optical imaging system illustrated in FIG. 7.

Referring to FIG. 7, an optical imaging system 400 according to the fourth embodiment of the present disclosure may include a first lens 401, a second lens 402, a third lens 403, a fourth lens 404, a fifth lens 405, a sixth lens 406, a seventh lens 407, an eighth lens 408, and a ninth lens 409, and may further include a filter 410 and an image sensor IS.

The optical imaging system 400 according to the fourth embodiment of the present disclosure may focus an image on an imaging surface 411. The imaging surface 411 may be a surface on which an image is focused by the optical imaging system. For example, the imaging surface 411 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 7.

TABLE 7

| Surface Number | Element | Radius of Curvature | Thickness or Distance | Refractive Index | Abbe Number | Focal Length |
|---|---|---|---|---|---|---|
| S1 | First | 3.031 | 1.191 | 1.544 | 55.99 | 6.9814 |
| S2 | Lens | 12.721 | 0.100 | | | |
| S3 | Second | 4.187 | 0.230 | 1.671 | 19.24 | −15.5372 |
| S4 | Lens | 2.931 | 0.510 | | | |
| S5 | Third | 7.369 | 0.390 | 1.544 | 55.99 | −3000.1758 |
| S6 | Lens | 7.199 | 0.122 | | | |
| S7 | Fourth | 7.709 | 0.250 | 1.544 | 55.99 | 20.3420 |
| S8 | Lens | 24.881 | 0.519 | | | |
| S9 | Fifth | 139.745 | 0.337 | 1.671 | 19.24 | −62.7402 |
| S10 | Lens | 32.612 | 0.136 | | | |
| S11 | Sixth | 87.807 | 0.330 | 1.544 | 55.99 | −45651.5549 |
| S12 | Lens | 87.383 | 0.358 | | | |
| S13 | Seventh | 5.801 | 0.384 | 1.614 | 25.94 | −11.2300 |
| S14 | Lens | 3.084 | 0.175 | | | |
| S15 | Eighth | 2.207 | 0.600 | 1.567 | 37.40 | 5.1879 |
| S16 | Lens | 7.813 | 0.860 | | | |
| S17 | Ninth | 4.871 | 0.420 | 1.535 | 55.74 | −6.7597 |
| S18 | Lens | 2.018 | 0.309 | | | |
| S19 | Filter | Infinity | 0.210 | | | |
| S20 | | Infinity | 0.793 | | | |

TABLE 7-continued

| Surface Number | Element | Radius of Curvature | Thickness or Distance | Refractive Index | Abbe Number | Focal Length |
|---|---|---|---|---|---|---|
| S21 | Imaging Surface | Infinity | | | | |

The total focal length f of the optical imaging system 400 according to the fourth embodiment of the present disclosure is 6.6939 mm, the TTL is 8.223, the BFL is 1.312, the EPD is 4.4642 mm, the IMG HT is 6 mm, and the FOV is 81.2610°.

In the fourth embodiment of the present disclosure, the first lens 401 has a positive refractive power, a first surface of the first lens 401 has a shape convex in the paraxial region, and a second surface of the first lens 401 has a shape concave in the paraxial region.

The second lens 402 has a negative refractive power, a first surface of the second lens 402 has a shape convex in the paraxial region, and a second surface of the second lens 402 has a shape concave in the paraxial region.

The third lens 403 has a negative refractive power, a first surface of the third lens 403 has a shape convex in the paraxial region, and a second surface of the third lens 403 has a shape concave in the paraxial region.

The fourth lens 404 has a positive refractive power, a first surface of the fourth lens 404 has a shape convex in the paraxial region, and a second surface of the fourth lens 404 has a shape concave in the paraxial region.

The fifth lens 405 has a negative refractive power, a first surface of the fifth lens 405 has a shape convex in the paraxial region, and a second surface of the fifth lens 405 has a shape concave in the paraxial region.

The sixth lens 406 has a negative refractive power, a first surface of the sixth lens 406 has a shape convex in the paraxial region, and a second surface of the sixth lens 406 has a shape concave in the paraxial region.

The seventh lens 407 has a negative refractive power, a first surface of the seventh lens 407 has a shape convex in the paraxial region, and a second surface of the seventh lens 407 has a shape concave in the paraxial region.

The eighth lens 408 has a positive refractive power, a first surface of the eighth lens 408 has a shape convex in the paraxial region, and a second surface of the eighth lens 408 has a shape concave in the paraxial region.

The ninth lens 409 has a negative refractive power, a first surface of the ninth lens 409 has a shape convex in the paraxial region, and a second surface of the ninth lens 409 has a shape concave in the paraxial region.

In addition, any one or any combination of any two more of the sixth lens 406 to the ninth lens 409 has at least one inflection point formed on either one or both of the first and second surfaces.

Each surface of the first lens 401 to the ninth lens 409 has aspherical coefficients as illustrated in Table 8. For example, both an object-side surface and an image-side surface of the first lens 401 to the ninth lens 409 are aspherical surfaces.

TABLE 8

|  | S1 | S2 | S3 | S4 | S5 | S6 |
|---|---|---|---|---|---|---|
| Conic Constant (K) | −0.697 | −10.072 | −11.744 | −4.059 | −23.130 | −92.602 |
| Fourth Coefficient (A) | 2.569E−03 | −1.746E−02 | −2.977E−02 | −1.981E−02 | −1.281E−02 | 1.953E−03 |
| Sixth Coefficient (B) | −3.483E−04 | 2.823E−02 | 3.855E−02 | 2.254E−02 | 2.199E−02 | −4.943E−02 |
| Eighth Coefficient (C) | 3.734E−03 | −3.516E−02 | −3.674E−02 | −6.441E−03 | −4.991E−02 | 1.872E−01 |
| Tenth Coefficient (D) | −7.009E−03 | 4.032E−02 | 3.700E−02 | −1.089E−02 | 8.827E−02 | −4.888E−01 |
| Twelfth Coefficient (E) | 7.060E−03 | −3.904E−02 | −3.734E−02 | 2.030E−02 | −1.137E−01 | 8.536E−01 |
| Fourteenth Coefficient (F) | −4.435E−03 | 2.874E−02 | 2.980E−02 | −1.916E−02 | 1.049E−01 | −1.037E+00 |
| Sixteenth Coefficient (G) | 1.852E−03 | −1.546E−02 | −1.710E−02 | 1.115E−02 | −7.019E−02 | 8.978E−01 |
| Eighteenth Coefficient (H) | −5.295E−04 | 6.022E−03 | 6.948E−03 | −3.486E−03 | 3.438E−02 | −5.622E−01 |
| Twentieth Coefficient (J) | 1.044E−04 | −1.690E−03 | −1.995E−03 | 3.221E−05 | −1.234E−02 | 2.550E−01 |
| Twenty-second Coefficient (L) | −1.403E−05 | 3.379E−04 | 4.008E−04 | 4.530E−04 | 3.214E−03 | −8.301E−02 |
| Twenty-fourth Coefficient (M) | 1.247E−06 | −4.685E−05 | −5.496E−05 | −1.930E−04 | −5.914E−04 | 1.889E−02 |
| Twenty-sixth Coefficient (N) | −6.849E−08 | 4.277E−06 | 4.890E−06 | 3.970E−05 | 7.280E−05 | −2.851E−03 |
| Twenty-eighth Coefficient (O) | 2.028E−09 | −2.310E−07 | −2.537E−07 | −4.219E−06 | −5.364E−06 | 2.564E−04 |
| Thirtieth Coefficient (P) | −2.271E−11 | 5.589E−09 | 5.822E−09 | 1.850E−07 | 1.781E−07 | −1.040E−05 |

|  | S7 | S8 | S9 | S10 | S11 | S12 |
|---|---|---|---|---|---|---|
| Conic Constant (K) | −76.157 | 70.831 | 0.000 | 0.000 | 99.000 | −99.000 |
| Fourth Coefficient (A) | −2.007E−03 | −4.414E−03 | −2.505E−02 | −1.511E−02 | 2.646E−02 | 1.623E−02 |
| Sixth Coefficient (B) | −7.011E−03 | −4.503E−02 | −1.277E−03 | 3.251E−03 | −2.971E−02 | −1.338E−02 |
| Eighth Coefficient (C) | 1.039E−02 | 1.941E−01 | 4.276E−02 | −1.765E−02 | −8.041E−03 | −2.094E−02 |
| Tenth Coefficient (D) | −1.228E−02 | −4.949E−01 | −1.346E−01 | 2.844E−02 | 4.562E−02 | 4.097E−02 |
| Twelfth Coefficient (E) | 7.313E−04 | 8.210E−01 | 2.337E−01 | −2.360E−02 | −5.170E−02 | −3.480E−02 |
| Fourteenth Coefficient (F) | 1.506E−02 | −9.366E−01 | −2.631E−01 | 1.016E−02 | 3.328E−02 | 1.820E−02 |
| Sixteenth Coefficient (G) | −2.063E−02 | 7.566E−01 | 2.036E−01 | −9.617E−04 | −1.406E−02 | −6.419E−03 |
| Eighteenth Coefficient (H) | 1.479E−02 | −4.394E−01 | −1.112E−01 | −1.375E−03 | 4.090E−03 | 1.588E−03 |
| Twentieth Coefficient (J) | −6.642E−03 | 1.840E−01 | 4.330E−02 | 8.507E−04 | −8.353E−04 | −2.800E−04 |
| Twenty-second Coefficient (L) | 1.953E−03 | −5.507E−02 | −1.193E−02 | −2.555E−04 | 1.196E−04 | 3.530E−05 |
| Twenty-fourth Coefficient (M) | −3.743E−04 | 1.148E−02 | 2.270E−03 | 4.603E−05 | −1.175E−05 | −3.131E−06 |
| Twenty-sixth Coefficient (N) | 4.447E−05 | −1.581E−03 | −2.838E−04 | −5.039E−06 | 7.545E−07 | 1.871E−07 |
| Twenty-eighth Coefficient (O) | −2.885E−06 | 1.294E−04 | 2.095E−05 | 3.092E−07 | −2.851E−08 | −6.799E−09 |
| Thirtieth Coefficient (P) | 7.279E−08 | −4.762E−06 | −6.918E−07 | −8.144E−09 | 4.805E−10 | 1.139E−10 |

|  | S13 | S14 | S15 | S16 | S17 | S18 |
|---|---|---|---|---|---|---|
| Conic Constant (K) | 0.000 | −22.243 | −7.872 | −99.000 | −33.406 | −7.020 |
| Fourth Coefficient (A) | −5.069E−02 | −7.139E−02 | 1.572E−04 | 5.894E−02 | −8.672E−02 | −5.141E−02 |

TABLE 8-continued

| | | | | | | |
|---|---|---|---|---|---|---|
| Sixth Coefficient (B) | 6.241E−02 | 6.157E−02 | 6.045E−07 | −3.202E−02 | 2.355E−02 | 1.261E−02 |
| Eighth Coefficient (C) | −6.171E−02 | −4.524E−02 | −5.602E−03 | 1.067E−02 | −3.335E−03 | −1.507E−03 |
| Tenth Coefficient (D) | 4.333E−02 | 2.562E−02 | 3.554E−03 | −2.990E−03 | 1.143E−04 | −9.996E−05 |
| Twelfth Coefficient (E) | −2.169E−02 | −1.033E−02 | −1.337E−03 | 6.576E−04 | 4.885E−05 | 6.328E−05 |
| Fourteenth Coefficient (F) | 7.876E−03 | 2.909E−03 | 3.286E−04 | −1.074E−04 | −1.063E−05 | −1.019E−05 |
| Sixteenth Coefficient (G) | −2.124E−03 | −5.772E−04 | −5.461E−05 | 1.278E−05 | 1.160E−06 | 9.300E−07 |
| Eighteenth Coefficient (H) | 4.310E−04 | 8.136E−05 | 6.353E−06 | −1.096E−06 | −8.162E−08 | −5.459E−08 |
| Twentieth Coefficient (J) | −6.569E−05 | −8.120E−06 | −5.271E−07 | 6.740E−08 | 3.945E−09 | 2.145E−09 |
| Twenty-second Coefficient (L) | 7.395E−06 | 5.642E−07 | 3.101E−08 | −2.932E−09 | −1.327E−10 | −5.651E−11 |
| Twenty-fourth Coefficient (M) | −5.935E−07 | −2.635E−08 | −1.251E−09 | 8.793E−11 | 3.060E−12 | 9.708E−13 |
| Twenty-sixth Coefficient (N) | 3.192E−08 | 7.735E−10 | 3.220E−11 | −1.729E−12 | −4.614E−14 | −1.013E−14 |
| Twenty-eighth Coefficient (O) | −1.026E−09 | −1.247E−11 | −4.581E−13 | 2.006E−14 | 4.099E−16 | 5.461E−17 |
| Thirtieth Coefficient (P) | 1.482E−11 | 7.805E−14 | 2.507E−15 | −1.041E−16 | −1.626E−18 | −9.418E−20 |

Additionally, the optical imaging system described above may have the aberration characteristics illustrated in FIG. 8.

Figure 9:
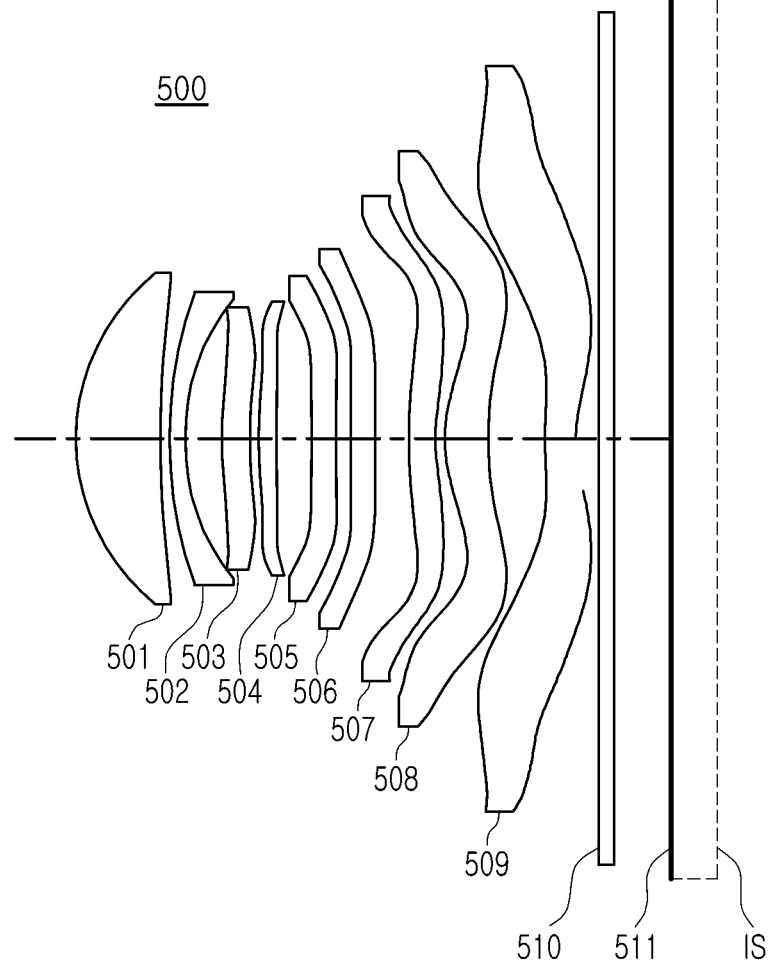
FIG. 9 illustrates a structural view of an optical imaging system according to a fifth embodiment of the present disclosure.
Figure 10:
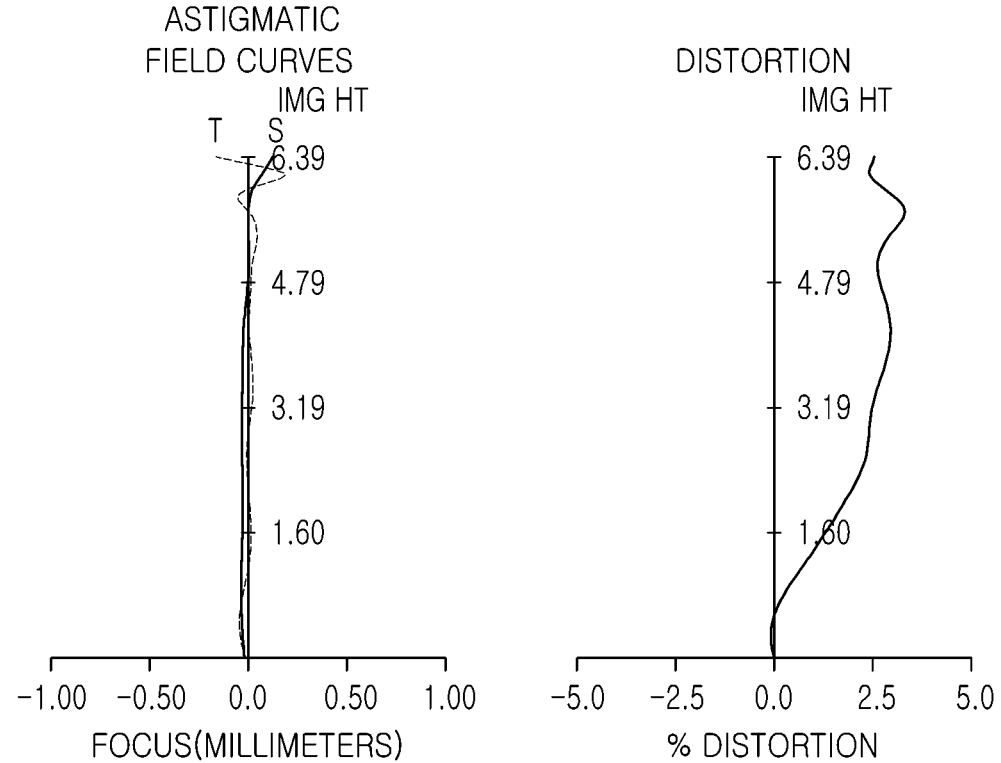
FIG. 10 is a view illustrating aberration characteristics of the optical imaging system illustrated in FIG. 9.

FIG. 9 illustrates a structural view of an optical imaging system according to a fifth embodiment of the present disclosure, and FIG. 10 is a view illustrating aberration characteristics of the optical imaging system illustrated in FIG. 9.

Referring to FIG. 9, an optical imaging system 500 according to the fifth embodiment of the present disclosure may include a first lens 501, a second lens 502, a third lens 503, a fourth lens 504, a fifth lens 505, a sixth lens 506, a seventh lens 507, an eighth lens 508, and a ninth lens 509, and may further include a filter 510 and an image sensor IS.

The optical imaging system 500 according to the fifth embodiment of the present disclosure may focus an image on an imaging surface 511. The imaging surface 511 may be a surface on which an image is focused by the optical imaging system. For example, the imaging surface 511 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 9.

TABLE 9

| Surface Number | Element | Radius of Curvature | Thickness or Distance | Refractive Index | Abbe Number | Focal Length |
|---|---|---|---|---|---|---|
| S1 | First | 3.023 | 1.173 | 1.544 | 55.99 | 6.9020 |
| S2 | Lens | 13.158 | 0.123 | | | |
| S3 | Second | 4.191 | 0.231 | 1.671 | 19.24 | −14.8337 |
| S4 | Lens | 2.893 | 0.494 | | | |
| S5 | Third | 7.322 | 0.404 | 1.544 | 55.99 | −1801.1172 |
| S6 | Lens | 7.127 | 0.112 | | | |
| S7 | Fourth | 7.698 | 0.251 | 1.544 | 55.99 | 23.1200 |
| S8 | Lens | 19.485 | 0.475 | | | |
| S9 | Fifth | 24.361 | 0.352 | 1.671 | 19.24 | 237.1578 |
| S10 | Lens | 28.536 | 0.207 | | | |
| S11 | Sixth | −156.205 | 0.330 | 1.544 | 55.99 | 199.7283 |
| S12 | Lens | −64.290 | 0.450 | | | |

TABLE 9-continued

| Surface Number | Element | Radius of Curvature | Thickness or Distance | Refractive Index | Abbe Number | Focal Length |
|---|---|---|---|---|---|---|
| S13 | Seventh | 6.589 | 0.368 | 1.614 | 25.94 | −7.7318 |
| S14 | Lens | 2.716 | 0.131 | | | |
| S15 | Eighth | 2.080 | 0.605 | 1.567 | 37.40 | 4.6466 |
| S16 | Lens | 8.620 | 0.772 | | | |
| S17 | Ninth | 5.520 | 0.431 | 1.535 | 55.74 | −6.6775 |
| S18 | Lens | 2.115 | 0.311 | | | |
| S19 | Filter | Infinity | 0.210 | | | |
| S20 | | Infinity | 0.790 | | | |
| S21 | Imaging Surface | Infinity | | | | |

The total focal length f of the optical imaging system 500 according to the fifth embodiment of the present disclosure is 6.7263 mm, the TTL is 8.220, the BFL is 1.311, the EPD is 4.4845 mm, the IMG HT is 6 mm, and the FOV is 81.049°.

In the fifth embodiment of the present disclosure, the first lens 501 has a positive refractive power, a first surface of the first lens 501 has a shape convex in the paraxial region, and a second surface of the first lens 501 has a shape concave in the paraxial region.

The second lens 502 has a negative refractive power, a first surface of the second lens 502 has a shape convex in the paraxial region, and a second surface of the second lens 502 has a shape concave in the paraxial region.

The third lens 503 has a negative refractive power, a first surface of the third lens 503 has a shape convex in the paraxial region, and a second surface of the third lens 503 has a shape concave in the paraxial region.

The fourth lens 504 has a positive refractive power, a first surface of the fourth lens 504 has a shape convex in the paraxial region, and a second surface of the fourth lens 504 has a shape concave in the paraxial region.

The fifth lens 505 has a positive refractive power, a first surface of the fifth lens 505 has a shape convex in the paraxial region, and a second surface of the fifth lens 505 has a shape concave in the paraxial region.

The sixth lens 506 has a positive refractive power, a first surface of the sixth lens 506 has a shape concave in the paraxial region, and a second surface of the sixth lens 506 has a shape convex in the paraxial region.

The seventh lens 507 has a negative refractive power, a first surface of the seventh lens 507 has a shape convex in the paraxial region, and a second surface of the seventh lens 507 has a shape concave in the paraxial region.

The eighth lens 508 has a positive refractive power, a first surface of the eighth lens 508 has a shape convex in the paraxial region, and a second surface of the eighth lens 508 has a shape concave in the paraxial region.

The ninth lens 509 has a negative refractive power, a first surface of the ninth lens 509 has a shape convex in the paraxial region, and a second surface of the ninth lens 509 has a shape concave in the paraxial region.

Additionally, any one or any combination of any two or more of the sixth lens 506 to the ninth lens 509 has at least one inflection point formed on either one or both of the first and second surfaces.

Each surface of the first lens 501 to the ninth lens 509 has aspherical coefficients as illustrated in Table 10. For example, both an object-side surface and an image-side surface of the first lens 501 to the ninth lens 509 are aspherical surfaces.

TABLE 10

| | S1 | S2 | S3 | S4 | S5 | S6 |
|---|---|---|---|---|---|---|
| Conic Constant (K) | −0.718 | −10.912 | −11.862 | −4.045 | −21.000 | −79.229 |
| Fourth Coefficient (A) | 2.959E−03 | −1.823E−02 | −3.285E−02 | −2.610E−02 | −1.188E−02 | 1.540E−03 |
| Sixth Coefficient (B) | −1.978E−03 | 3.190E−02 | 4.899E−02 | 4.768E−02 | 2.252E−02 | −4.640E−02 |
| Eighth Coefficient (C) | 6.208E−03 | −4.213E−02 | −4.933E−02 | −5.503E−02 | −5.279E−02 | 1.817E−01 |
| Tenth Coefficient (D) | −9.086E−03 | 4.658E−02 | 3.712E−02 | 4.774E−02 | 9.442E−02 | −4.811E−01 |
| Twelfth Coefficient (E) | 8.038E−03 | −4.194E−02 | −2.115E−02 | −3.105E−02 | −1.235E−01 | 8.432E−01 |
| Fourteenth Coefficient (F) | −4.643E−03 | 2.924E−02 | 9.028E−03 | 1.875E−02 | 1.161E−01 | −1.024E+00 |
| Sixteenth Coefficient (G) | 1.822E−03 | −1.530E−02 | −2.814E−03 | −1.435E−02 | −7.902E−02 | 8.853E−01 |
| Eighteenth Coefficient (H) | −4.946E−04 | 5.911E−03 | 6.064E−04 | 1.131E−02 | 3.909E−02 | −5.531E−01 |
| Twentieth Coefficient (J) | 9.298E−05 | −1.665E−03 | −7.538E−05 | −6.672E−03 | −1.405E−02 | 2.503E−01 |
| Twenty-second Coefficient (L) | −1.191E−05 | 3.366E−04 | −2.000E−07 | 2.662E−03 | 3.630E−03 | −8.127E−02 |
| Twenty-fourth Coefficient (M) | 9.993E−07 | −4.738E−05 | 2.007E−06 | −6.962E−04 | −6.576E−04 | 1.844E−02 |
| Twenty-sixth Coefficient (N) | −5.078E−08 | 4.402E−06 | −3.686E−07 | 1.143E−04 | 7.930E−05 | −2.776E−03 |
| Twenty-eighth Coefficient (O) | 1.317E−09 | −2.424E−07 | 3.048E−08 | −1.069E−05 | −5.707E−06 | 2.491E−04 |
| Thirtieth Coefficient(P) | −1.050E−11 | 5.985E−09 | −1.004E−09 | 4.331E−07 | 1.851E−07 | −1.008E−05 |

| | S7 | S8 | S9 | S10 | S11 | S12 |
|---|---|---|---|---|---|---|
| Conic Constant (K) | −70.836 | 53.833 | 0.000 | 0.000 | −54.114 | −93.969 |
| Fourth Coefficient (A) | −1.477E−03 | −3.982E−03 | −2.937E−02 | 3.306E−03 | 2.782E−02 | 9.153E−03 |
| Sixth Coefficient (B) | −9.000E−03 | −5.697E−02 | 5.022E−02 | −5.781E−02 | −1.929E−02 | 1.849E−02 |
| Eighth Coefficient (C) | 1.271E−02 | 2.468E−01 | −1.415E−01 | 1.401E−01 | −2.507E−02 | −7.039E−02 |
| Tenth Coefficient (D) | −1.292E−02 | −6.382E−01 | 2.403E−01 | −2.492E−01 | 5.852E−02 | 8.840E−02 |
| Twelfth Coefficient (E) | −5.274E−04 | 1.068E+00 | −2.616E−01 | 3.084E−01 | −5.720E−02 | −6.602E−02 |
| Fourteenth Coefficient (F) | 1.746E−02 | −1.219E+00 | 1.869E−01 | −2.666E−01 | 3.466E−02 | 3.296E−02 |
| Sixteenth Coefficient (G) | −2.314E−02 | 9.791E−01 | −8.620E−02 | 1.633E−01 | −1.429E−02 | −1.154E−02 |
| Eighteenth Coefficient (H) | 1.662E−02 | −5.630E−01 | 2.305E−02 | −7.161E−02 | 4.141E−03 | 2.890E−03 |
| Twentieth Coefficient (J) | −7.592E−03 | 2.329E−01 | −1.633E−03 | 2.254E−02 | −8.517E−04 | −5.211E−04 |
| Twenty-second Coefficient (L) | 2.302E−03 | −6.871E−02 | −1.177E−03 | −5.040E−03 | 1.235E−04 | 6.718E−05 |
| Twenty-fourth Coefficient (M) | −4.631E−04 | 1.411E−02 | 4.773E−04 | 7.809E−04 | −1.233E−05 | −6.054E−06 |
| Twenty-sixth Coefficient (N) | 5.928E−05 | −1.914E−03 | −8.592E−05 | −7.959E−05 | 8.054E−07 | 3.629E−07 |

TABLE 10-continued

| | | | | | | |
|---|---|---|---|---|---|---|
| Twenty-eighth Coefficient (O) | −4.342E−06 | 1.543E−04 | 7.963E−06 | 4.796E−06 | −3.096E−08 | −1.303E−08 |
| Thirtieth Coefficient (P) | 1.367E−07 | −5.592E−06 | −3.080E−07 | −1.293E−07 | 5.304E−10 | 2.124E−10 |

| | S13 | S14 | S15 | S16 | S17 | S18 |
|---|---|---|---|---|---|---|
| Conic Constant (K) | 0.000 | −23.300 | −7.915 | −97.069 | −26.222 | −7.232 |
| Fourth Coefficient (A) | −5.425E−02 | −6.427E−02 | −4.519E−03 | 6.672E−02 | −7.680E−02 | −4.089E−02 |
| Sixth Coefficient (B) | 7.499E−02 | 5.225E−02 | 5.087E−03 | −4.112E−02 | 1.431E−02 | 4.290E−03 |
| Eighth Coefficient (C) | −7.365E−02 | −3.246E−02 | −9.525E−03 | 1.539E−02 | 1.011E−03 | 2.077E−03 |
| Tenth Coefficient (D) | 4.933E−02 | 1.330E−02 | 5.123E−03 | −4.306E−03 | −9.992E−04 | −1.039E−03 |
| Twelfth Coefficient (E) | −2.372E−02 | −3.068E−03 | −1.548E−03 | 8.760E−04 | 2.232E−04 | 2.248E−04 |
| Fourteenth Coefficient(F) | 8.503E−03 | 1.858E−04 | 2.691E−04 | −1.287E−04 | −2.859E−05 | −2.924E−05 |
| Sixteenth Coefficient (G) | −2.322E−03 | 1.037E−04 | −2.225E−05 | 1.365E−05 | 2.428E−06 | 2.512E−06 |
| Eighteenth Coefficient (H) | 4.835E−04 | −3.583E−05 | −6.406E−07 | −1.041E−06 | −1.440E−07 | −1.485E−07 |
| Twentieth Coefficient (J) | −7.562E−05 | 5.956E−06 | 3.795E−07 | 5.661E−08 | 6.073E−09 | 6.139E−09 |
| Twenty-second Coefficient (L) | 8.651E−06 | −6.131E−07 | −4.548E−08 | −2.157E−09 | −1.816E−10 | −1.775E−10 |
| Twenty-fourth Coefficient (M) | −6.968E−07 | 4.083E−08 | 2.994E−09 | 5.585E−11 | 3.768E−12 | 3.517E−12 |
| Twenty-sixth Coefficient (N) | 3.719E−08 | −1.719E−09 | −1.177E−10 | −9.278E−13 | −5.154E−14 | −4.551E−14 |
| Twenty-eighth Coefficient (O) | −1.175E−09 | 4.169E−11 | 2.597E−12 | 8.812E−15 | 4.179E−16 | 3.467E−16 |
| Thirtieth Coefficient (P) | 1.660E−11 | −4.446E−13 | −2.490E−14 | −3.569E−17 | −1.521E−18 | −1.179E−18 |

Additionally, the optical imaging system described above may have the aberration characteristics illustrated in FIG. 10.

Figure 11:
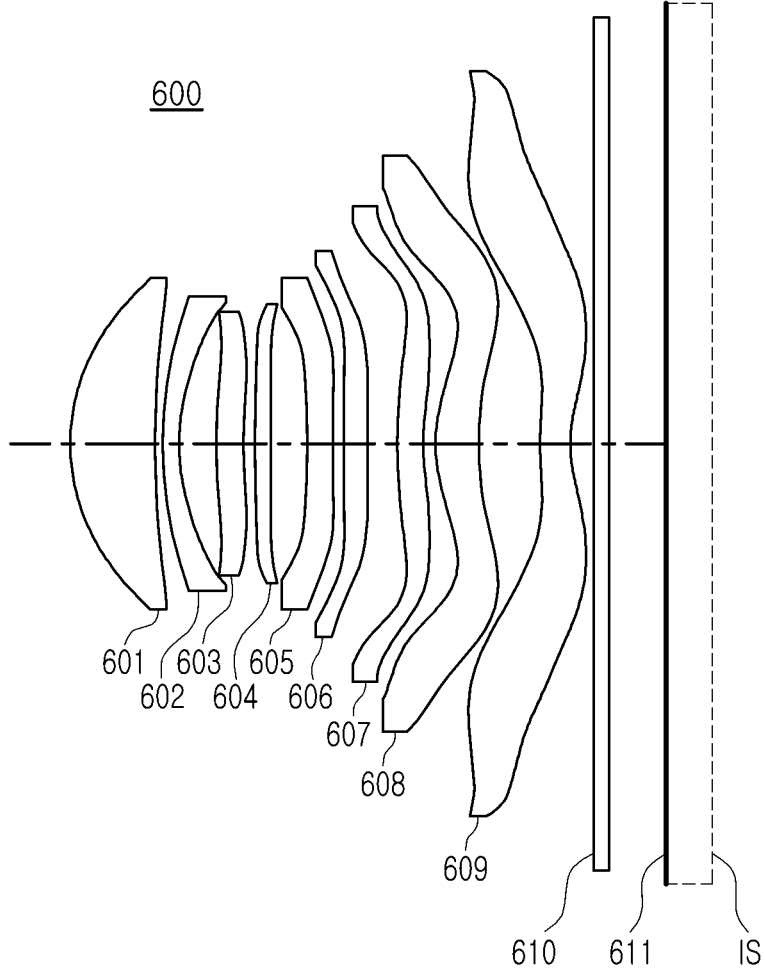
FIG. 11 illustrates a structural view of an optical imaging system according to a sixth embodiment of the present disclosure.
Figure 12:
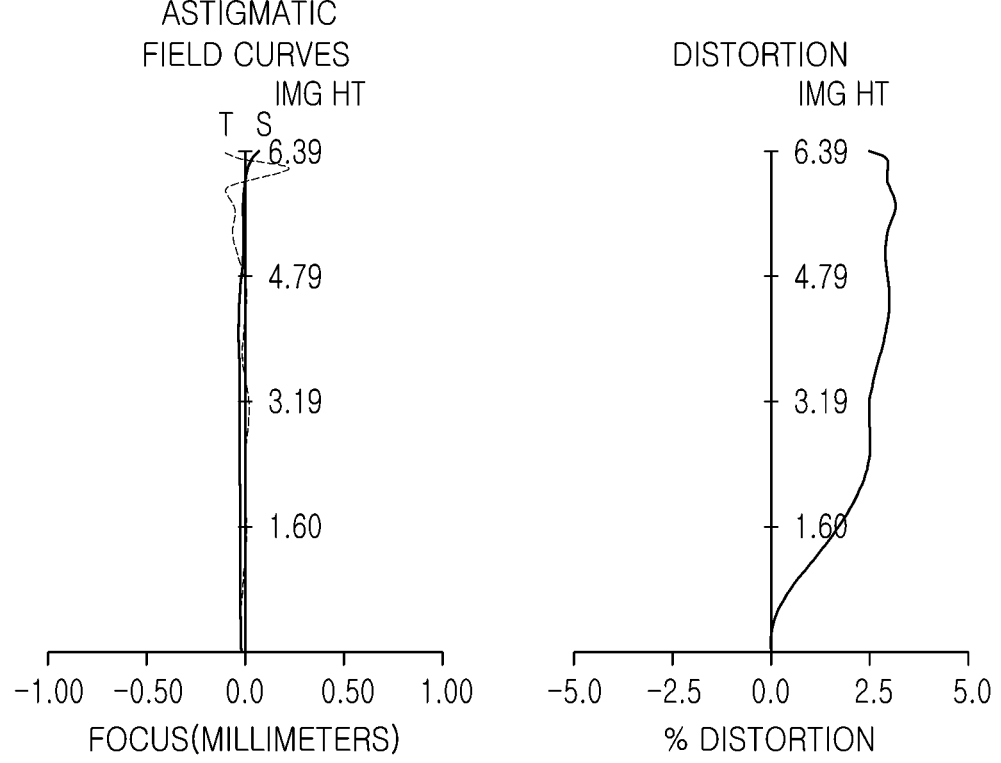
FIG. 12 is a view illustrating aberration characteristics of the optical imaging system illustrated in FIG. 11.

FIG. 11 illustrates a structural view of an optical imaging system according to a sixth embodiment of the present disclosure, and FIG. 12 is a view illustrating aberration characteristics of the optical imaging system illustrated in FIG. 11.

Referring to FIG. 11, an optical imaging system 600 according to the sixth embodiment of this invention may include a first lens 601, a second lens 602, a third lens 603, a fourth lens 604, a fifth lens 605, a sixth lens 606, a seventh lens 607, an eighth lens 608, and a ninth lens 609, and may further include a filter 610 and an image sensor IS.

The optical imaging system 600 according to the sixth embodiment of the present disclosure may focus an image on an imaging surface 611. The imaging surface 611 may be a surface on which an image is focused by the optical imaging system. For example, the imaging surface 611 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 11.

TABLE 11

| Surface Number | Element | Radius of Curvature | Thickness or Distance | Refractive Index | Abbe Number | Focal Length |
|---|---|---|---|---|---|---|
| S1 | First | 3.040 | 1.169 | 1.544 | 55.99 | 7.0155 |
| S2 | Lens | 12.708 | 0.100 | | | |
| S3 | Second | 4.219 | 0.232 | 1.671 | 19.24 | −15.8299 |
| S4 | Lens | 2.962 | 0.506 | | | |
| S5 | Third | 7.444 | 0.390 | 1.544 | 55.99 | 302.3081 |
| S6 | Lens | 7.651 | 0.133 | | | |
| S7 | Fourth | 8.251 | 0.250 | 1.544 | 55.99 | 22.6277 |
| S8 | Lens | 24.546 | 0.503 | | | |
| S9 | Fifth | 549.597 | 0.358 | 1.671 | 19.24 | −30.4163 |
| S10 | Lens | 19.896 | 0.129 | | | |
| S11 | Sixth | 28.581 | 0.355 | 1.544 | 55.99 | 33.5276 |
| S12 | Lens | −50.784 | 0.388 | | | |
| S13 | Seventh | 6.522 | 0.360 | 1.614 | 25.94 | −10.2312 |
| S14 | Lens | 3.148 | 0.168 | | | |
| S15 | Eighth | 2.196 | 0.600 | 1.567 | 37.40 | 5.2652 |
| S16 | Lens | 7.353 | 0.841 | | | |
| S17 | Ninth | 4.601 | 0.420 | 1.535 | 55.74 | −6.8317 |
| S18 | Lens | 1.976 | 0.319 | | | |

TABLE 11-continued

| Surface Number | Element | Radius of Curvature | Thickness or Distance | Refractive Index | Abbe Number | Focal Length |
|---|---|---|---|---|---|---|
| S19 | Filter | Infinity | 0.210 | | | |
| S20 | | Infinity | 0.790 | | | |
| S21 | Imaging Surface | Infinity | | | | |

The total focal length f of the optical imaging system 600 according to the sixth embodiment of the present disclosure is 6.6506 mm, the TTL is 8.220, the BFL is 1.319, the EPD is 4.44 mm, the IMG HT is 6 mm, and the FOV is 81.613°.

In the sixth embodiment of the present disclosure, the first lens 601 has a positive refractive power, a first surface of the first lens 601 has a shape convex in the paraxial region, and a second surface of the first lens 601 has a shape concave in the paraxial region.

The second lens 602 has a negative refractive power, a first surface of the second lens 602 has a shape convex in the paraxial region, and a second surface of the second lens 602 has a shape concave in the paraxial region.

The third lens 603 has a positive refractive power, a first surface of the third lens 603 has a shape convex in the paraxial region, and a second surface of the third lens 603 has a shape concave in the paraxial region.

The fourth lens 604 has a positive refractive power, a first surface of the fourth lens 604 has a shape convex in the paraxial region, and a second surface of the fourth lens 604 has a shape concave in the paraxial region.

The fifth lens 605 has a negative refractive power, a first surface of the fifth lens 605 has a shape convex in the paraxial region, and a second surface of the fifth lens 605 has a shape concave in the paraxial region.

The sixth lens 606 has a positive refractive power, and a first surface and a second surface of the sixth lens 606 have a shape convex in the paraxial region.

The seventh lens 607 has a negative refractive power, a first surface of the seventh lens 607 has a shape convex in the paraxial region, and a second surface of the seventh lens 607 has a shape concave in the paraxial region.

The eighth lens 608 has a positive refractive power, a first surface of the eighth lens 608 has a shape convex in the paraxial region, and a second surface of the eighth lens 608 has a shape concave in the paraxial region.

The ninth lens 609 has a negative refractive power, a first surface of the ninth lens 609 has a shape convex in the paraxial region, and a second surface of the ninth lens 609 has a shape concave in the paraxial region.

Additionally, any one or any combination of any two or more of the sixth lens 606 to the ninth lens 609 has at least one inflection point formed on either one or both of the first and second surfaces.

Each surface of the first lens 601 to the ninth lens 609 has aspherical coefficients as illustrated in Table 12. For example, both an object-side surface and an image-side surface of the first lens 601 to the ninth lens 609 are aspherical surfaces.

TABLE 12

| | S1 | S2 | S3 | S4 | S5 | S6 |
|---|---|---|---|---|---|---|
| Conic Constant (K) | −0.701 | −9.626 | −11.489 | −4.088 | −23.978 | −89.151 |
| Fourth Coefficient (A) | 2.898E−03 | −1.845E−02 | −2.925E−02 | −1.681E−02 | −1.179E−02 | 1.445E−03 |
| Sixth Coefficient (B) | −1.127E−03 | 3.157E−02 | 3.500E−02 | 7.158E−03 | 2.141E−02 | −4.856E−02 |
| Eighth Coefficient (C) | 4.530E−03 | −4.304E−02 | −2.588E−02 | 4.045E−02 | −5.172E−02 | 1.864E−01 |
| Tenth Coefficient (D) | −7.315E−03 | 5.328E−02 | 1.826E−02 | −1.018E−01 | 9.319E−02 | −4.858E−01 |
| Twelfth Coefficient (E) | 6.906E−03 | −5.365E−02 | −1.666E−02 | 1.381E−01 | −1.202E−01 | 8.469E−01 |
| Fourteenth Coefficient (F) | −4.176E−03 | 4.020E−02 | 1.415E−02 | −1.258E−01 | 1.102E−01 | −1.028E+00 |
| Sixteenth Coefficient (G) | 1.696E−03 | −2.184E−02 | −8.679E−03 | 8.043E−02 | −7.308E−02 | 8.898E−01 |
| Eighteenth Coefficient (H) | −4.728E−04 | 8.579E−03 | 3.677E−03 | −3.616E−02 | 3.544E−02 | −5.574E−01 |
| Twentieth Coefficient (J) | 9.081E−05 | −2.428E−03 | −1.075E−03 | 1.123E−02 | −1.259E−02 | 2.532E−01 |
| Twenty-second Coefficient (L) | −1.184E−05 | 4.896E−04 | 2.156E−04 | −2.307E−03 | 3.251E−03 | −8.255E−02 |
| Twenty-fourth Coefficient (M) | 1.008E−06 | −6.852E−05 | −2.896E−05 | 2.829E−04 | −5.941E−04 | 1.883E−02 |
| Twenty-sixth Coefficient (N) | −5.183E−08 | 6.319E−06 | 2.474E−06 | −1.476E−05 | 7.282E−05 | −2.852E−03 |
| Twenty-eighth Coefficient (O) | 1.354E−09 | −3.450E−07 | −1.205E−07 | −5.036E−07 | −5.355E−06 | 2.576E−04 |
| Thirtieth Coefficient (P) | −1.068E−11 | 8.441E−09 | 2.524E−09 | 7.063E−08 | 1.778E−07 | −1.050E−05 |

| | S7 | S8 | S9 | S10 | S11 | S12 |
|---|---|---|---|---|---|---|
| Conic Constant (K) | −73.797 | 68.549 | 0.000 | 0.000 | 73.805 | 99.000 |

TABLE 12-continued

| | | | | | | |
|---|---|---|---|---|---|---|
| Fourth Coefficient (A) | −1.595E−03 | −1.601E−03 | −1.619E−02 | −1.238E−02 | 2.371E−02 | 2.214E−02 |
| Sixth Coefficient (B) | −7.552E−03 | −5.052E−02 | −3.323E−02 | −1.544E−02 | −3.620E−02 | −2.430E−02 |
| Eighth Coefficient (C) | 1.049E−02 | 2.055E−01 | 1.228E−01 | 1.593E−02 | 9.039E−03 | 6.726E−04 |
| Tenth Coefficient (D) | −1.214E−02 | −5.144E−01 | −2.658E−01 | −3.511E−03 | 2.507E−02 | 1.559E−02 |
| Twelfth Coefficient (E) | 6.523E−04 | 8.433E−01 | 3.815E−01 | −9.276E−03 | −3.700E−02 | −1.584E−02 |
| Fourteenth Coefficient (F) | 1.505E−02 | −9.531E−01 | −3.818E−01 | 1.215E−02 | 2.645E−02 | 8.513E−03 |
| Sixteenth Coefficient (G) | −2.056E−02 | 7.641E−01 | 2.728E−01 | −7.949E−03 | −1.191E−02 | −2.903E−03 |
| Eighteenth Coefficient (H) | 1.472E−02 | −4.409E−01 | −1.408E−01 | 3.393E−03 | 3.632E−03 | 6.627E−04 |
| Twentieth Coefficient (J) | −6.593E−03 | 1.837E−01 | 5.247E−02 | −1.024E−03 | −7.698E−04 | −1.031E−04 |
| Twenty-second Coefficient (L) | 1.930E−03 | −5.471E−02 | −1.397E−02 | 2.249E−04 | 1.137E−04 | 1.094E−05 |
| Twenty-fourth Coefficient (M) | −3.671E−04 | 1.136E−02 | 2.585E−03 | −3.564E−05 | −1.148E−05 | −7.832E−07 |
| Twenty-sixth Coefficient (N) | 4.301E−05 | −1.560E−03 | −3.156E−04 | 3.875E−06 | 7.555E−07 | 3.696E−08 |
| Twenty-eighth Coefficient (O) | −2.716E−06 | 1.273E−04 | 2.283E−05 | −2.577E−07 | −2.919E−08 | −1.087E−09 |
| Thirtieth Coefficient (P) | 6.417E−08 | −4.677E−06 | −7.405E−07 | 7.843E−09 | 5.019E−10 | 1.611E−11 |

| | S13 | S14 | S15 | S16 | S17 | S18 |
|---|---|---|---|---|---|---|
| Conic Constant (K) | 0.000 | −23.030 | −7.970 | −98.972 | −31.452 | −6.924 |
| Fourth Coefficient (A) | −4.637E−02 | −7.463E−02 | 7.863E−04 | 6.679E−02 | −7.999E−02 | −4.652E−02 |
| Sixth Coefficient (B) | 5.593E−02 | 6.274E−02 | 8.763E−06 | −3.896E−02 | 1.809E−02 | 9.398E−03 |
| Eighth Coefficient (C) | −5.191E−02 | −4.384E−02 | −6.387E−03 | 1.473E−02 | −1.417E−03 | −5.315E−04 |
| Tenth Coefficient (D) | 3.405E−02 | 2.379E−02 | 4.538E−03 | −4.584E−03 | −2.695E−04 | −2.784E−04 |
| Twelfth Coefficient (E) | −1.590E−02 | −9.358E−03 | −1.953E−03 | 1.081E−03 | 9.836E−05 | 8.264E−05 |
| Fourteenth Coefficient (F) | 5.342E−03 | 2.592E−03 | 5.498E−04 | −1.841E−04 | −1.504E−05 | −1.119E−05 |
| Sixteenth Coefficient (G) | −1.323E−03 | −5.069E−04 | −1.046E−04 | 2.243E−05 | 1.443E−06 | 9.065E−07 |
| Eighteenth Coefficient (H) | 2.456E−04 | 7.013E−05 | 1.385E−05 | −1.951E−06 | −9.492E−08 | −4.699E−08 |
| Twentieth Coefficient (J) | −3.439E−05 | −6.811E−06 | −1.294E−06 | 1.211E−07 | 4.407E−09 | 1.562E−09 |
| Twenty-second Coefficient (L) | 3.597E−06 | 4.535E−07 | 8.486E−08 | −5.304E−09 | −1.444E−10 | −3.119E−11 |
| Twenty-fourth Coefficient (M) | −2.721E−07 | −1.973E−08 | −3.804E−09 | 1.602E−10 | 3.270E−12 | 2.819E−13 |
| Twenty-sixth Coefficient (N) | 1.400E−08 | 5.087E−10 | 1.102E−10 | −3.173E−12 | −4.866E−14 | 1.530E−15 |
| Twenty-eighth Coefficient (O) | −4.349E−10 | −6.124E−12 | −1.845E−12 | 3.710E−14 | 4.278E−16 | −5.811E−17 |
| Thirtieth Coefficient (P) | 6.122E−12 | 9.413E−15 | 1.337E−14 | −1.941E−16 | −1.683E−18 | 3.824E−19 |

Additionally, the optical imaging system described above may have the aberration characteristics illustrated in FIG. 12.

Figure 13:
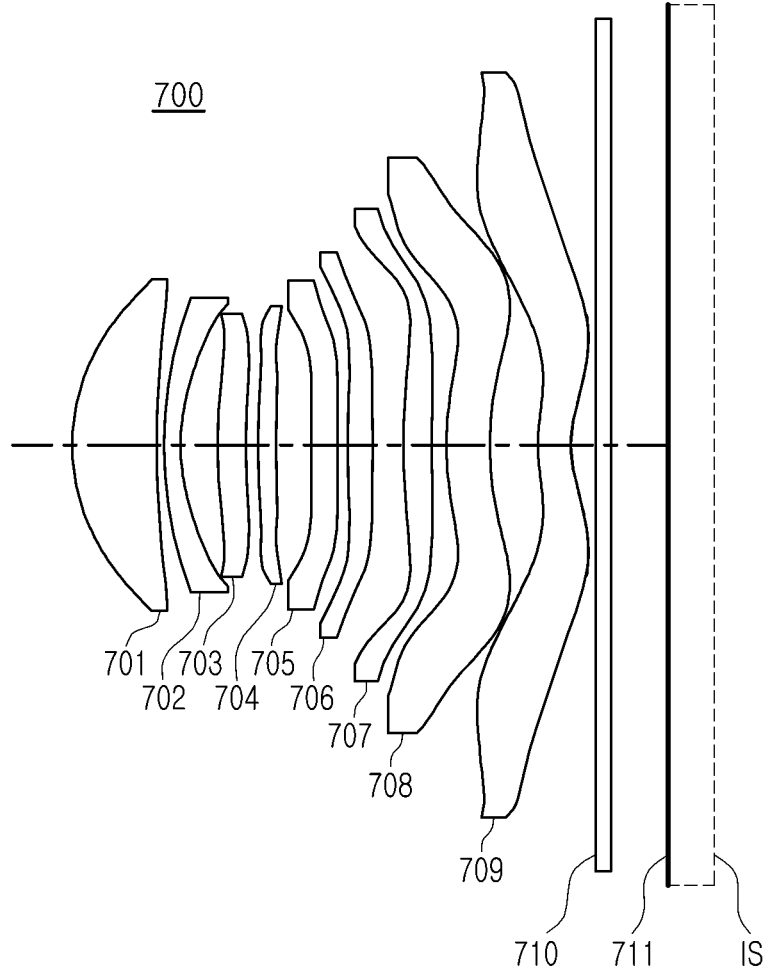
FIG. 13 illustrates a structural view of an optical imaging system according to a seventh embodiment of the present disclosure.
Figure 14:
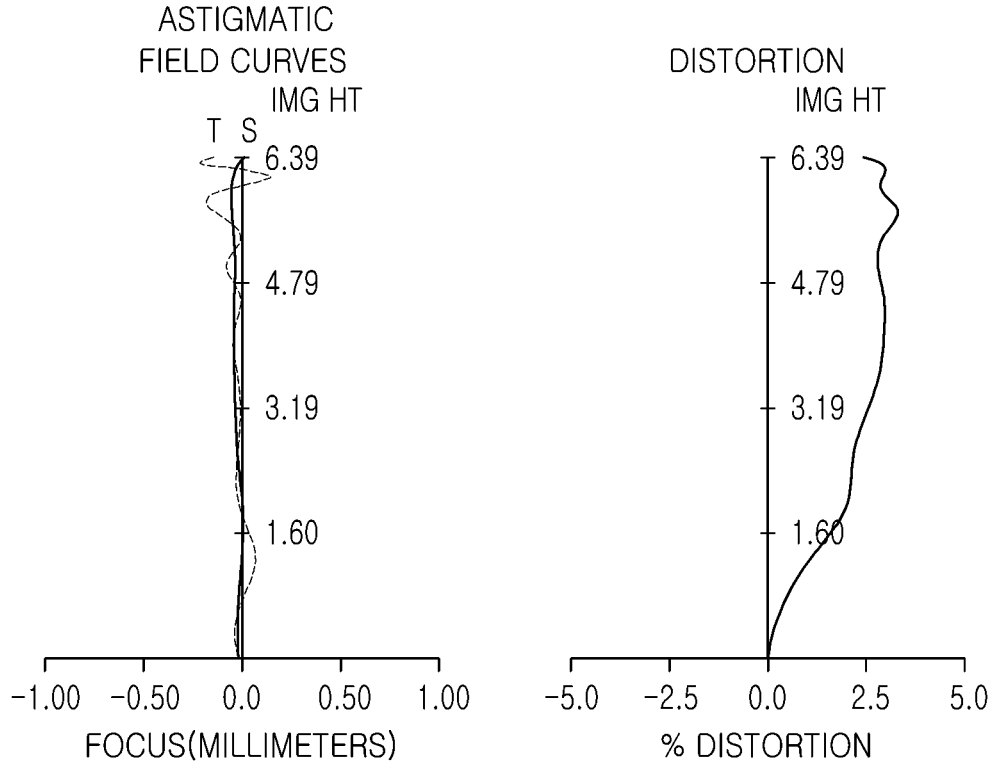
FIG. 14 is a view illustrating aberration characteristics of the optical imaging system illustrated in FIG. 13.

FIG. 13 illustrates a structural view of an optical imaging system according to a seventh embodiment of the present disclosure, and FIG. 14 is a view illustrating aberration characteristics of the optical imaging system illustrated in FIG. 13.

Referring to FIG. 13, an optical imaging system 700 according to the seventh embodiment of the present disclosure may include a first lens 701, a second lens 702, a third lens 703, a fourth lens 704, a fifth lens 705, a sixth lens 706, a seventh lens 707, an eighth lens 708, and a ninth lens 709, and may further include a filter 710 and an image sensor IS.

The optical imaging system 700 according to the seventh embodiment of the present disclosure may focus an image on an imaging surface 711. The imaging surface 711 may be a surface on which an image is focused by the optical imaging system. For example, the imaging surface 711 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 13.

TABLE 13

| Surface Number | Element | Radius of Curvature | Thickness or Distance | Refractive Index | Abbe Number | Focal Length |
|---|---|---|---|---|---|---|
| S1 | First | 3.037 | 1.164 | 1.544 | 55.99 | 7.0094 |
| S2 | Lens | 12.689 | 0.100 | | | |
| S3 | Second | 4.100 | 0.230 | 1.671 | 19.24 | −16.0549 |
| S4 | Lens | 2.912 | 0.510 | | | |
| S5 | Third | 7.362 | 0.391 | 1.544 | 55.99 | 153.2859 |
| S6 | Lens | 7.920 | 0.161 | | | |
| S7 | Fourth | 8.517 | 0.253 | 1.544 | 55.99 | 24.3728 |
| S8 | Lens | 23.383 | 0.505 | | | |
| S9 | Fifth | 162.323 | 0.339 | 1.671 | 19.24 | −30.3532 |
| S10 | Lens | 18.270 | 0.145 | | | |
| S11 | Sixth | 28.685 | 0.349 | 1.544 | 55.99 | 32.8434 |
| S12 | Lens | −47.709 | 0.420 | | | |
| S13 | Seventh | 6.876 | 0.390 | 1.614 | 25.94 | 25.2709 |
| S14 | Lens | 11.987 | 0.204 | | | |
| S15 | Eighth | 4.636 | 0.600 | 1.567 | 37.40 | 4999.9997 |
| S16 | Lens | 4.425 | 0.662 | | | |
| S17 | Ninth | 2.454 | 0.453 | 1.535 | 55.74 | −10.4563 |
| S18 | Lens | 1.598 | 0.341 | | | |
| S19 | Filter | Infinity | 0.210 | | | |
| S20 | | Infinity | 0.790 | | | |
| S21 | Imaging Surface | Infinity | | | | |

The total focal length f of the optical imaging system 700 according to the seventh embodiment of the present disclosure is 6.7006 mm, the TTL is 8.220, the BFL is 1.341, the EPD is 4.4701 mm, the IMG HT is 6 mm, and the FOV is 81.18°.

In the seventh embodiment of the present disclosure, the first lens 701 has a positive refractive power, a first surface of the first lens 701 has a shape convex in the paraxial region, and a second surface of the first lens 701 has a shape concave in the paraxial region.

The second lens 702 has a negative refractive power, a first surface of the second lens 702 has a shape convex in the paraxial region, and a second surface of the second lens 702 has a shape concave in the paraxial region.

The third lens 703 has a positive refractive power, a first surface of the third lens 703 has a shape convex in the paraxial region, and a second surface of the third lens 703 has a shape concave in the paraxial region.

The fourth lens 704 has a positive refractive power, a first surface of the fourth lens 704 has a shape convex in the paraxial region, and a second surface of the fourth lens 704 has a shape concave in the paraxial region.

The fifth lens 705 has a negative refractive power, a first surface of the fifth lens 705 has a shape convex in the paraxial region, and a second surface of the fifth lens 705 has a shape concave in the paraxial region.

The sixth lens 706 has a positive refractive power, and a first surface and a second surface of the sixth lens 706 have a shape convex in the paraxial region.

The seventh lens 707 has a positive refractive power, a first surface of the seventh lens 707 has a shape convex in the paraxial region, and a second surface of the seventh lens 707 has a shape concave in the paraxial region.

The eighth lens 708 has a positive refractive power, a first surface of the eighth lens 708 has a shape convex in the paraxial region, and a second surface of the eighth lens 708 has a shape concave in the paraxial region.

The ninth lens 709 has a negative refractive power, a first surface of the ninth lens 709 has a shape convex in the paraxial region, and a second surface of the ninth lens 709 has a shape concave in the paraxial region.

Additionally, any one or any combination of any two or more of the sixth lens 706 to the ninth lens 709 has at least one inflection point formed on either one or both of the first and second surfaces.

Each surface of the first lens 701 to the ninth lens 709 has aspherical coefficients as illustrated in Table 14. For example, both an object-side surface and an image-side surface of the first lens 701 to the ninth lens 709 are aspherical surfaces.

TABLE 14

| | S1 | S2 | S3 | S4 | S5 | S6 |
|---|---|---|---|---|---|---|
| Conic Constant (K) | −0.715 | −10.954 | −11.464 | −4.101 | −23.289 | −89.374 |
| Fourth Coefficient (A) | 3.102E−03 | −2.504E−02 | −4.184E−02 | −2.547E−02 | −6.890E−03 | 1.145E−03 |
| Sixth Coefficient (B) | −3.424E−03 | 5.030E−02 | 8.263E−02 | 3.799E−02 | −2.252E−03 | −4.802E−02 |
| Eighth Coefficient (C) | 1.069E−02 | −6.939E−02 | −1.066E−01 | 4.878E−03 | 2.303E−02 | 1.826E−01 |
| Tenth Coefficient (D) | −1.629E−02 | 7.765E−02 | 1.057E−01 | −1.043E−01 | −5.672E−02 | −4.695E−01 |
| Twelfth Coefficient (E) | 1.503E−02 | −7.059E−02 | −8.385E−02 | 1.974E−01 | 8.096E−02 | 8.093E−01 |
| Fourteenth Coefficient (F) | −9.073E−03 | 4.968E−02 | 5.189E−02 | −2.127E−01 | −7.694E−02 | −9.718E−01 |
| Sixteenth Coefficient (G) | 3.732E−03 | −2.620E−02 | −2.426E−02 | 1.516E−01 | 5.046E−02 | 8.328E−01 |

TABLE 14-continued

| | | | | | | |
|---|---|---|---|---|---|---|
| Eighteenth Coefficient (H) | −1.068E−03 | 1.018E−02 | 8.378E−03 | −7.455E−02 | −2.314E−02 | −5.162E−01 |
| Twentieth Coefficient (J) | 2.140E−04 | −2.884E−03 | −2.098E−03 | 2.551E−02 | 7.391E−03 | 2.319E−01 |
| Twenty-second Coefficient (L) | −2.975E−05 | 5.853E−04 | 3.720E−04 | −5.990E−03 | −1.603E−03 | −7.479E−02 |
| Twenty-fourth Coefficient (M) | 2.794E−06 | −8.272E−05 | −4.509E−05 | 9.300E−04 | 2.234E−04 | 1.687E−02 |
| Twenty-sixth Coefficient (N) | −1.681E−07 | 7.717E−06 | 3.516E−06 | −8.851E−05 | −1.776E−05 | −2.524E−03 |
| Twenty-eighth Coefficient (O) | 5.798E−09 | −4.265E−07 | −1.570E−07 | 4.398E−06 | 5.733E−07 | 2.252E−04 |
| Thirtieth Coefficient (P) | −8.636E−11 | 1.057E−08 | 3.001E−09 | −7.303E−08 | 4.402E−09 | −9.065E−06 |

| | S7 | S8 | S9 | S10 | S11 | S12 |
|---|---|---|---|---|---|---|
| Conic Constant (K) | −73.403 | 69.886 | 0.000 | 0.000 | 71.611 | −1.865 |
| Fourth Coefficient (A) | −1.361E−03 | −8.536E−03 | −1.836E−02 | 7.557E−03 | 4.431E−02 | 2.340E−02 |
| Sixth Coefficient (B) | −7.787E−03 | −8.751E−04 | −2.800E−02 | −1.108E−01 | −1.070E−01 | −7.079E−02 |
| Eighth Coefficient (C) | 1.033E−02 | 4.332E−02 | 8.706E−02 | 2.308E−01 | 1.441E−01 | 9.973E−02 |
| Tenth Coefficient (D) | −1.145E−02 | −1.896E−01 | −1.515E−01 | −3.057E−01 | −1.237E−01 | −8.474E−02 |
| Twelfth Coefficient (E) | −8.853E−04 | 4.128E−01 | 1.868E−01 | 2.788E−01 | 6.664E−02 | 4.609E−02 |
| Fourteenth Coefficient (F) | 1.740E−02 | −5.593E−01 | −1.732E−01 | −1.827E−01 | −2.222E−02 | −1.712E−02 |
| Sixteenth Coefficient (G) | −2.303E−02 | 5.093E−01 | 1.218E−01 | 8.812E−02 | 4.089E−03 | 4.542E−03 |
| Eighteenth Coefficient (H) | 1.653E−02 | −3.230E−01 | −6.435E−02 | −3.161E−02 | −1.198E−04 | −8.872E−04 |
| Twentieth Coefficient (J) | −7.526E−03 | 1.447E−01 | 2.507E−02 | 8.393E−03 | −1.397E−04 | 1.295E−04 |
| Twenty-second Coefficient (L) | 2.270E−03 | −4.561E−02 | −7.033E−03 | −1.622E−03 | 3.862E−05 | −1.404E−05 |
| Twenty-fourth Coefficient (M) | −4.525E−04 | 9.904E−03 | 1.373E−03 | 2.205E−04 | −5.303E−06 | 1.092E−06 |
| Twenty-sixth Coefficient (N) | 5.712E−05 | −1.410E−03 | −1.765E−04 | −1.989E−05 | 4.228E−07 | −5.694E−08 |
| Twenty-eighth Coefficient (O) | −4.095E−06 | 1.185E−04 | 1.338E−05 | 1.062E−06 | −1.867E−08 | 1.747E−09 |
| Thirtieth Coefficient (P) | 1.245E−07 | −4.454E−06 | −4.527E−07 | −2.522E−08 | 3.545E−10 | −2.323E−11 |

| | S13 | S14 | S15 | S16 | S17 | S18 |
|---|---|---|---|---|---|---|
| Conic Constant (K) | 0.000 | −10.490 | −6.706 | −98.962 | −25.407 | −7.317 |
| Fourth Coefficient (A) | −3.563E−02 | −4.535E−02 | −7.000E−03 | 6.623E−02 | −6.380E−02 | −4.619E−02 |
| Sixth Coefficient (B) | 1.446E−02 | 2.891E−02 | 9.489E−03 | −3.893E−02 | 7.915E−03 | 1.051E−02 |
| Eighth Coefficient (C) | −1.031E−02 | −2.300E−02 | −1.288E−02 | 1.389E−02 | 1.768E−03 | −2.017E−03 |
| Tenth Coefficient (D) | 1.454E−02 | 1.819E−02 | 6.427E−03 | −4.029E−03 | −8.810E−04 | 2.687E−04 |
| Twelfth Coefficient (E) | −1.222E−02 | −9.850E−03 | −1.952E−03 | 9.208E−04 | 1.764E−04 | −2.104E−05 |
| Fourteenth Coefficient (F) | 6.079E−03 | 3.448E−03 | 3.814E−04 | −1.576E−04 | −2.193E−05 | 9.841E−07 |
| Sixteenth Coefficient (G) | −1.994E−03 | −8.070E−04 | −4.676E−05 | 1.959E−05 | 1.866E−06 | −5.336E−08 |
| Eighteenth Coefficient (H) | 4.565E−04 | 1.300E−04 | 3.179E−06 | −1.743E−06 | −1.128E−07 | 5.782E−09 |
| Twentieth Coefficient (J) | −7.467E−05 | −1.460E−05 | −3.421E−08 | 1.103E−07 | 4.889E−09 | −4.868E−10 |
| Twenty-second Coefficient (L) | 8.718E−06 | 1.140E−06 | −1.473E−08 | −4.912E−09 | −1.508E−10 | 2.461E−11 |
| Twenty-fourth Coefficient (M) | −7.093E−07 | −6.058E−08 | 1.463E−09 | 1.503E−10 | 3.231E−12 | −7.570E−13 |
| Twenty-sixth Coefficient (N) | 3.813E−08 | 2.087E−09 | −6.912E−11 | −3.005E−12 | −4.562E−14 | 1.404E−14 |
| Twenty-eighth Coefficient (O) | −1.214E−09 | −4.196E−11 | 1.719E−12 | 3.537E−14 | 3.813E−16 | −1.449E−16 |

TABLE 14-continued

| | | | | | |
|---|---|---|---|---|---|
| Thirtieth Coefficient (P) | 1.730E−11 | 3.730E−13 | −1.808E−14 | −1.860E−16 | −1.428E−18 | 6.421E−19 |

Additionally, the optical imaging system described above may have the aberration characteristics illustrated in FIG. 14.

Figure 15:
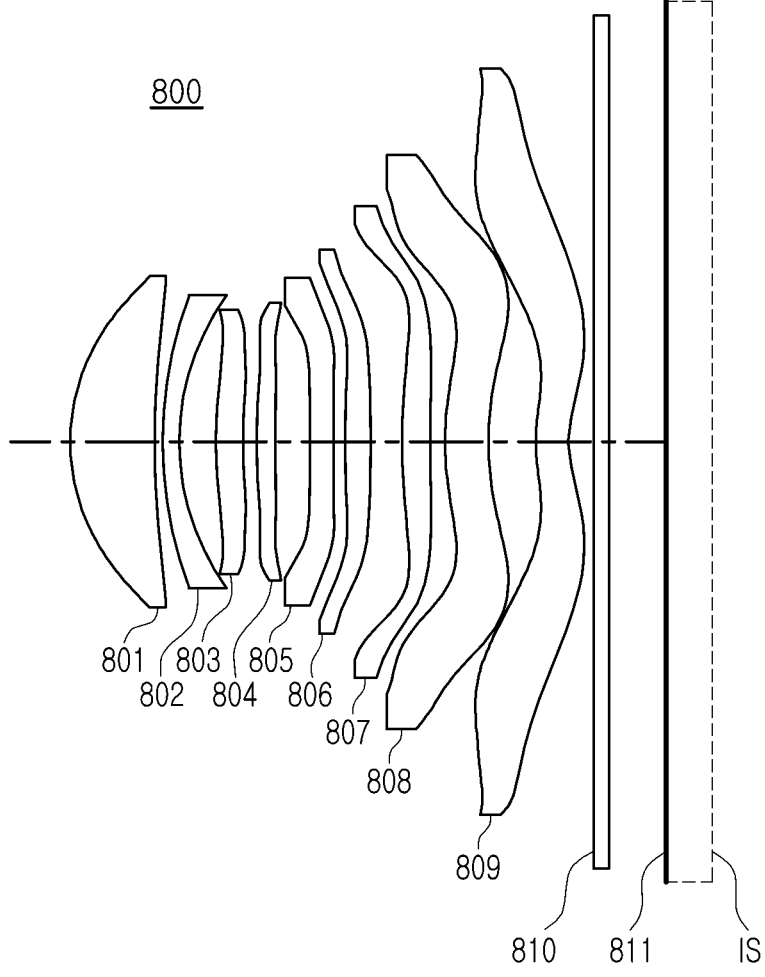
FIG. 15 illustrates a structural view of an optical imaging system according to an eighth embodiment of the present disclosure.
Figure 16:
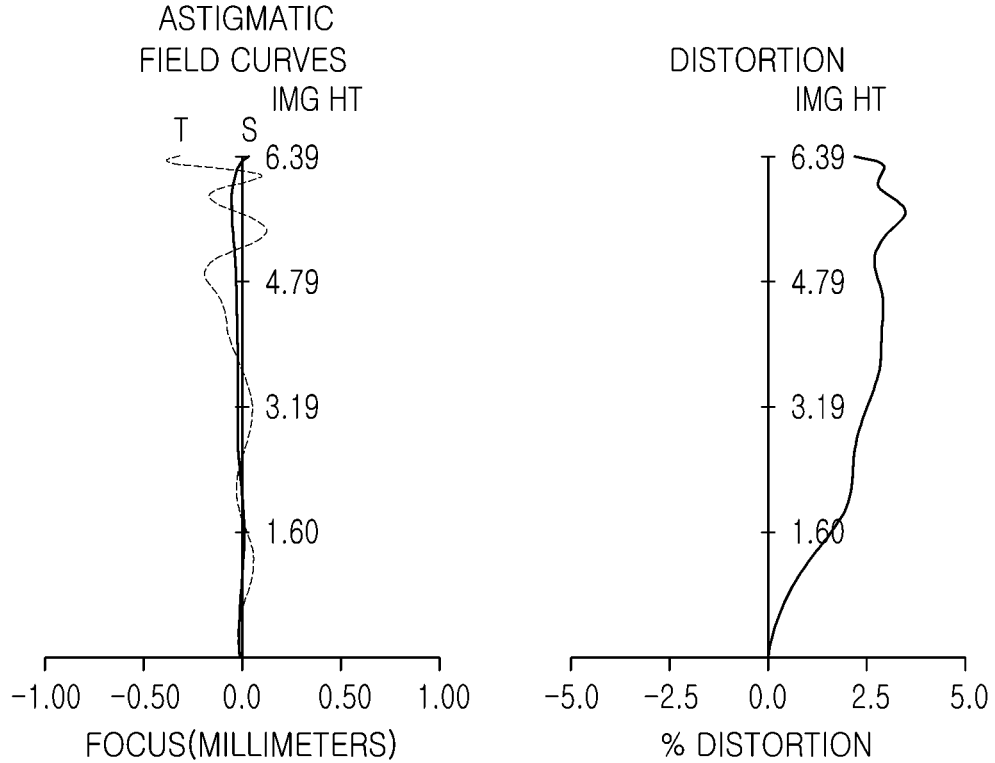
FIG. 16 is a view illustrating aberration characteristics of the optical imaging system illustrated in FIG. 15.

FIG. 15 illustrates a structural view of an optical imaging system according to an eighth embodiment of the present disclosure, and FIG. 16 is a view illustrating aberration characteristics of the optical imaging system illustrated in FIG. 15.

Referring to FIG. 15, an optical imaging system 800 according to the eighth embodiment of the present disclosure may include a first lens 801, a second lens 802, a third lens 803, a fourth lens 804, a fifth lens 805, a sixth lens 806, a seventh 807, an eighth lens 808, and a ninth lens 809, and may further include a filter 810 and an image sensor IS.

The optical imaging system 800 according to the eighth embodiment of the present disclosure may focus an image on an imaging surface 811. The imaging surface 811 may be a surface on which an image is focused by the optical imaging system. For example, the imaging surface 811 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 15.

The third lens 803 has a positive refractive power, a first surface of the third lens 803 has a shape convex in the paraxial region, and a second surface of the third lens 803 has a shape concave in the paraxial region.

The fourth lens 804 has a positive refractive power, a first surface of the fourth lens 804 has a shape convex in the paraxial region, and a second surface of the fourth lens 804 has a shape concave in the paraxial region.

The fifth lens 805 has a negative refractive power, a first surface of the fifth lens 805 has a shape convex in the paraxial region, and a second surface of the fifth lens 805 has a shape concave in the paraxial region.

The sixth lens 806 has a positive refractive power, and a first surface and a second surface of the sixth lens 806 have a shape convex in the paraxial region.

The seventh lens 807 has a positive refractive power, a first surface of the seventh lens 807 has a shape convex in the paraxial region, and a second surface of the seventh lens 807 has a shape concave in the paraxial region.

The eighth lens 808 has a negative refractive power, a first surface of the eighth lens 808 has a shape convex in the paraxial region, and a second surface of the eighth lens 808 has a shape concave in the paraxial region.

The ninth lens 809 has a negative refractive power, a first surface of the ninth lens 809 has a shape convex in the

TABLE 15

| Surface Number | Element | Radius of Curvature | Thickness or Distance | Refractive Index | Abbe Number | Focal Length |
|---|---|---|---|---|---|---|
| S1 | First | 3.036 | 1.166 | 1.544 | 55.99 | 7.0093 |
| S2 | Lens | 12.673 | 0.106 | | | |
| S3 | Second | 4.076 | 0.231 | 1.671 | 19.24 | −16.0863 |
| S4 | Lens | 2.900 | 0.508 | | | |
| S5 | Third | 7.355 | 0.391 | 1.544 | 55.99 | 160.2945 |
| S6 | Lens | 7.878 | 0.167 | | | |
| S7 | Fourth | 8.461 | 0.255 | 1.544 | 55.99 | 24.1696 |
| S8 | Lens | 23.301 | 0.504 | | | |
| S9 | Fifth | 159.181 | 0.341 | 1.671 | 19.24 | −30.2994 |
| S10 | Lens | 18.200 | 0.145 | | | |
| S11 | Sixth | 28.525 | 0.347 | 1.544 | 55.99 | 33.2333 |
| S12 | Lens | −49.736 | 0.419 | | | |
| S13 | Seventh | 6.842 | 0.388 | 1.614 | 25.94 | 24.4951 |
| S14 | Lens | 12.179 | 0.203 | | | |
| S15 | Eighth | 4.671 | 0.600 | 1.567 | 37.40 | −327.1333 |
| S16 | Lens | 4.344 | 0.653 | | | |
| S17 | Ninth | 2.424 | 0.456 | 1.535 | 55.74 | −10.6657 |
| S18 | Lens | 1.591 | 0.341 | | | |
| S19 | Filter | Infinity | 0.210 | | | |
| S20 | | Infinity | 0.790 | | | |
| S21 | Imaging Surface | Infinity | | | | |

The total focal length f of the optical imaging system 800 according to the eighth embodiment of the present disclosure is 6.7133 mm, the TTL is 8.220, the BFL is 1.341, the EPD is 4.4767 mm, the IMG HT is 6 mm, and the FOV is 81.134°.

In the eighth embodiment of the present disclosure, the first lens 801 has a positive refractive power, a first surface of the first lens 801 has a shape convex in the paraxial region, and a second surface of the first lens 801 has a shape concave in the paraxial region.

The second lens 802 has a negative refractive power, a first surface of the second lens 802 has a shape convex in the paraxial region, and a second surface of the second lens 802 has a shape concave in the paraxial region.

paraxial region, and a second surface of the ninth lens 809 has a shape concave in the paraxial region.

Additionally, any one or any combination of any two or more of the sixth lens 806 to the ninth lens 809 has at least one inflection point formed on either one or both of the first and second surfaces.

Each surface of the first lens 801 to the ninth lens 809 has aspherical coefficients as illustrated in Table 16. For example, both an object-side surface and an image-side surface of the first lens 801 to the ninth lens 809 are aspherical surfaces.

TABLE 16

| | S1 | S2 | S3 | S4 | S5 | S6 |
|---|---|---|---|---|---|---|
| Conic Constant (K) | −0.716 | −10.996 | −11.459 | −4.098 | −23.150 | −89.523 |
| Fourth Coefficient (A) | 2.158E−03 | −1.034E−02 | −2.534E−02 | −2.318E−02 | −6.813E−03 | 1.057E−03 |
| Sixth Coefficient (B) | 2.477E−03 | −3.391E−02 | −2.194E−02 | 2.774E−02 | 9.834E−03 | −4.800E−02 |
| Eighth Coefficient (C) | −2.740E−03 | 1.362E−01 | 1.651E−01 | −4.134E−03 | −4.884E−02 | 1.832E−01 |
| Tenth Coefficient(D) | −1.173E−04 | −2.140E−01 | −2.944E−01 | 4.569E−03 | 1.282E−01 | −4.714E−01 |
| Twelfth Coefficient (E) | 3.018E−03 | 2.001E−01 | 2.962E−01 | −4.936E−02 | −1.921E−01 | 8.132E−01 |
| Fourteenth Coefficient (F) | −3.114E−03 | −1.247E−01 | −1.965E−01 | 8.860E−02 | 1.829E−01 | −9.770E−01 |
| Sixteenth Coefficient (G) | 1.674E−03 | 5.424E−02 | 9.118E−02 | −8.299E−02 | −1.186E−01 | 8.379E−01 |
| Eighteenth Coefficient (H) | −5.628E−04 | −1.675E−02 | −3.041E−02 | 4.962E−02 | 5.429E−02 | −5.197E−01 |
| Twentieth Coefficient (J) | 1.251E−04 | 3.675E−03 | 7.355E−03 | −2.033E−02 | −1.783E−02 | 2.337E−01 |
| Twenty-second Coefficient (L) | −1.863E−05 | −5.643E−04 | −1.282E−03 | 5.840E−03 | 4.210E−03 | −7.540E−02 |
| Twenty-fourth Coefficient (M) | 1.829E−06 | 5.844E−05 | 1.574E−04 | −1.165E−03 | −7.030E−04 | 1.701E−02 |
| Twenty-sixth Coefficient (N) | −1.127E−07 | −3.803E−06 | −1.294E−05 | 1.544E−04 | 7.932E−05 | −2.548E−03 |
| Twenty-eighth Coefficient (O) | 3.909E−09 | 1.342E−07 | 6.400E−07 | −1.221E−05 | −5.442E−06 | 2.275E−04 |
| Thirtieth Coefficient (P) | −5.734E−11 | −1.742E−09 | −1.441E−08 | 4.350E−07 | 1.714E−07 | −9.160E−06 |

| | S7 | S8 | S9 | S10 | S11 | S12 |
|---|---|---|---|---|---|---|
| Conic Constant (K) | −72.751 | 70.531 | 0.000 | 0.000 | 72.471 | −30.426 |
| Fourth Coefficient (A) | −1.290E−03 | −1.152E−02 | −1.924E−02 | 9.343E−03 | 4.349E−02 | 2.489E−02 |
| Sixth Coefficient (B) | −7.857E−03 | 2.108E−02 | −2.682E−02 | −1.266E−01 | −1.065E−01 | −7.820E−02 |
| Eighth Coefficient (C) | 1.034E−02 | −3.651E−02 | 9.098E−02 | 2.859E−01 | 1.471E−01 | 1.158E−01 |
| Tenth Coefficient (D) | −1.150E−02 | −2.525E−02 | −1.619E−01 | −4.085E−01 | −1.298E−01 | −1.046E−01 |
| Twelfth Coefficient (E) | −6.977E−04 | 2.088E−01 | 1.931E−01 | 3.979E−01 | 7.215E−02 | 6.165E−02 |
| Fourteenth Coefficient (F) | 1.708E−02 | −4.038E−01 | −1.667E−01 | −2.759E−01 | −2.520E−02 | −2.527E−02 |
| Sixteenth Coefficient (G) | −2.268E−02 | 4.404E−01 | 1.078E−01 | 1.396E−01 | 5.154E−03 | 7.505E−03 |
| Eighteenth Coefficient (H) | 1.627E−02 | −3.112E−01 | −5.285E−02 | −5.207E−02 | −3.838E−04 | −1.648E−03 |
| Twentieth Coefficient (J) | −7.390E−03 | 1.494E−01 | 1.949E−02 | 1.429E−02 | −9.352E−05 | 2.684E−04 |
| Twenty-second Coefficient (L) | 2.219E−03 | −4.931E−02 | −5.288E−03 | −2.846E−03 | 3.293E−05 | −3.193E−05 |
| Twenty-fourth Coefficient (M) | −4.395E−04 | 1.104E−02 | 1.017E−03 | 3.985E−04 | −4.819E−06 | 2.683E−06 |
| Twenty-sixth Coefficient (N) | 5.493E−05 | −1.602E−03 | −1.304E−04 | −3.711E−05 | 3.958E−07 | −1.497E−07 |
| Twenty-eighth Coefficient (O) | −3.875E−06 | 1.362E−04 | 9.958E−06 | 2.058E−06 | −1.778E−08 | 4.942E−09 |
| Thirtieth Coefficient (P) | 1.146E−07 | −5.154E−06 | −3.410E−07 | −5.126E−08 | 3.414E−10 | −7.245E−11 |

| | S13 | S14 | S15 | S16 | S17 | S18 |
|---|---|---|---|---|---|---|
| Conic Constant (K) | 0.000 | −10.275 | −6.621 | −99.000 | −25.397 | −7.357 |
| Fourth Coefficient (A) | −3.524E−02 | −4.586E−02 | −6.591E−03 | 6.808E−02 | −6.437E−02 | −4.543E−02 |
| Sixth Coefficient (B) | 1.194E−02 | 3.161E−02 | 9.270E−03 | −4.125E−02 | 8.746E−03 | 9.166E−03 |
| Eighth Coefficient (C) | −4.777E−03 | −2.623E−02 | −1.334E−02 | 1.517E−02 | 1.313E−03 | −1.173E−03 |
| Tenth Coefficient (D) | 8.180E−03 | 2.015E−02 | 6.964E−03 | −4.439E−03 | −7.503E−04 | −7.063E−06 |
| Twelfth Coefficient (E) | −7.824E−03 | −1.055E−02 | −2.204E−03 | 1.008E−03 | 1.538E−04 | 3.347E−05 |

TABLE 16-continued

| | | | | | |
|---|---|---|---|---|---|
| Fourteenth Coefficient (F) | 4.109E-03 | 3.600E-03 | 4.481E-04 | -1.707E-04 | -1.938E-05 | -6.039E-06 |
| Sixteenth Coefficient (G) | -1.391E-03 | -8.264E-04 | -5.766E-05 | 2.100E-05 | 1.671E-06 | 5.623E-07 |
| Eighteenth Coefficient (H) | 3.272E-04 | 1.310E-04 | 4.296E-06 | -1.856E-06 | -1.023E-07 | -3.186E-08 |
| Twentieth Coefficient (J) | -5.504E-05 | -1.452E-05 | -1.013E-07 | 1.169E-07 | 4.493E-09 | 1.135E-09 |
| Twenty-second Coefficient (L) | 6.617E-06 | 1.120E-06 | -1.313E-08 | -5.187E-09 | -1.403E-10 | -2.440E-11 |
| Twenty-fourth Coefficient (M) | -5.546E-07 | -5.892E-08 | 1.531E-09 | 1.583E-10 | 3.039E-12 | 2.602E-13 |
| Twenty-sixth Coefficient (N) | 3.067E-08 | 2.010E-09 | -7.563E-11 | -3.160E-12 | -4.332E-14 | 2.287E-16 |
| Twenty-eighth Coefficient (O) | -1.002E-09 | -4.006E-11 | 1.916E-12 | 3.715E-14 | 3.651E-16 | -3.453E-17 |
| Thirtieth Coefficient (P) | 1.461E-11 | 3.532E-13 | -2.030E-14 | -1.952E-16 | -1.377E-18 | 2.478E-19 |

Additionally, the optical imaging system described above may have the aberration characteristics illustrated in FIG. 16.

Figure 17:
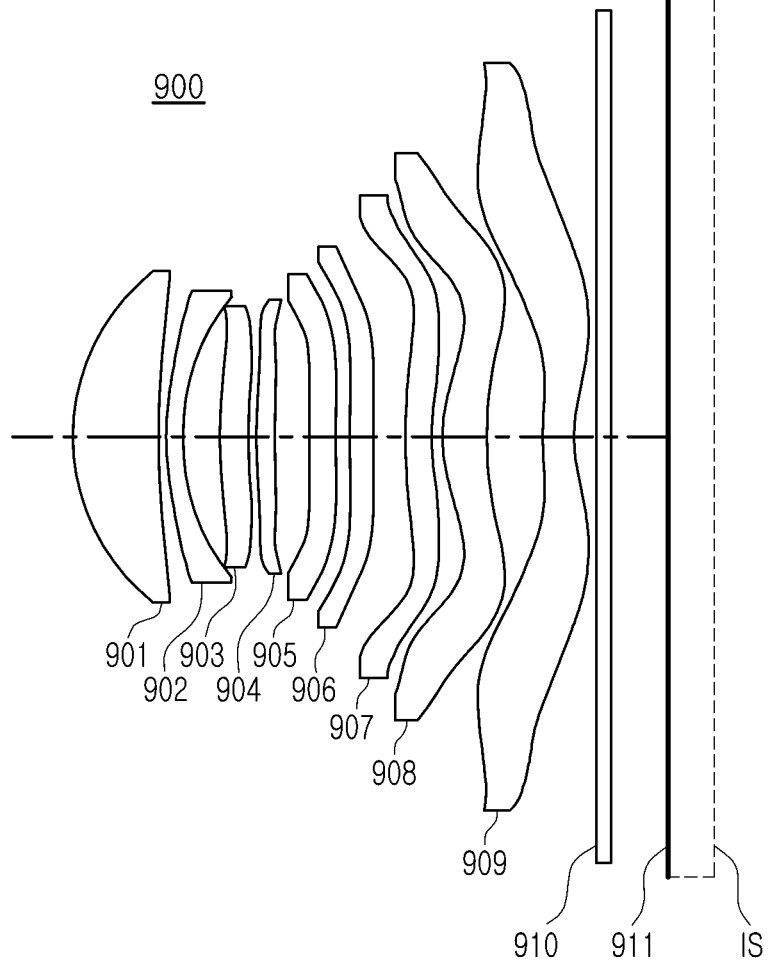
FIG. 17 illustrates a structural view of an optical imaging system according to a ninth embodiment of the present disclosure.
Figure 18:
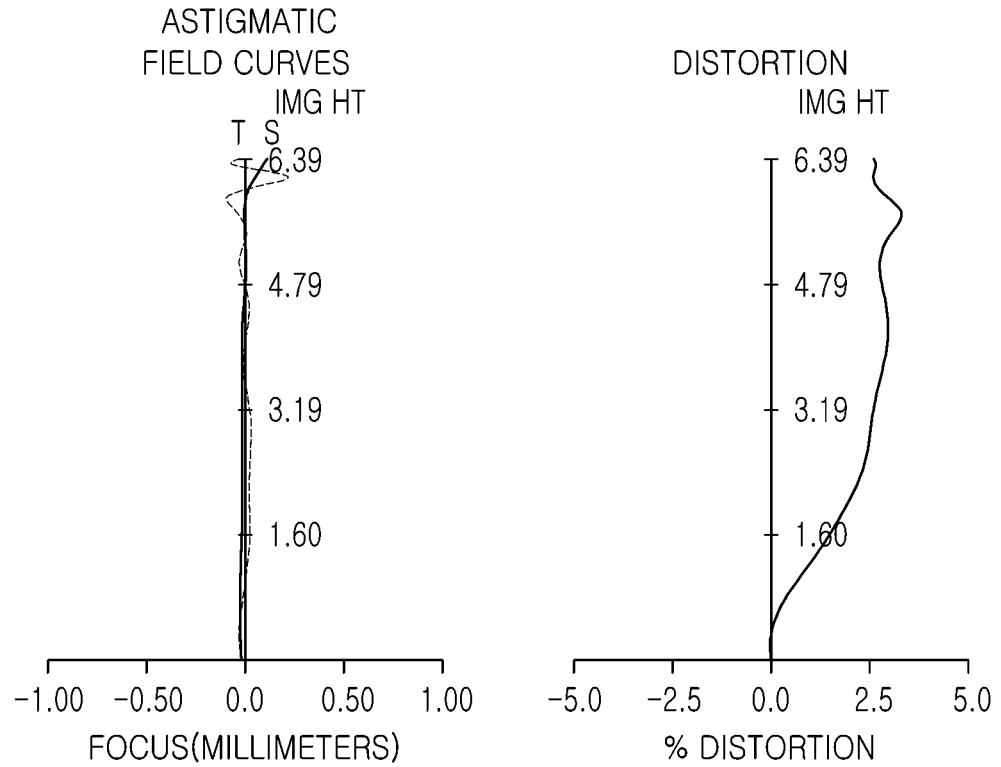
FIG. 18 is a view illustrating aberration characteristics of the optical imaging system illustrated in FIG. 17.

FIG. 17 illustrates a structural view of an optical imaging system according to a ninth embodiment of the present disclosure, and FIG. 18 is a view illustrating aberration characteristics of the optical imaging system illustrated in FIG. 17.

Referring to FIG. 17, an optical imaging system 900 according to the ninth embodiment of the present disclosure may include a first lens 901, a second lens 902, a third lens 903, a fourth lens 904, a fifth lens 905, a sixth lens 906, a seventh lens 907, an eighth lens 908, and a ninth lens 909, and may further include a filter 910 and an image sensor IS.

The optical imaging system 900 according to the ninth embodiment of the present disclosure may focus an image on an imaging surface 911. The imaging surface 911 may be a surface on which an image is focused by the optical imaging system. For example, the imaging surface 911 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 17.

TABLE 17

| Surface Number | Element | Radius of Curvature | Thickness or Distance | Refractive Index | Abbe Number | Focal Length |
|---|---|---|---|---|---|---|
| S1 | First | 3.020 | 1.189 | 1.544 | 55.99 | 6.9293 |
| S2 | Lens | 12.853 | 0.101 | | | |
| S3 | Second | 4.048 | 0.230 | 1.671 | 19.24 | -15.1596 |
| S4 | Lens | 2.838 | 0.512 | | | |
| S5 | Third | 7.412 | 0.392 | 1.544 | 55.99 | 241.5760 |
| S6 | Lens | 7.706 | 0.110 | | | |
| S7 | Fourth | 8.404 | 0.250 | 1.544 | 55.99 | 27.0667 |
| S8 | Lens | 19.266 | 0.485 | | | |
| S9 | Fifth | 23.361 | 0.358 | 1.671 | 19.24 | 770456.5629 |
| S10 | Lens | 23.217 | 0.196 | | | |
| S11 | Sixth | 159.283 | 0.330 | 1.544 | 55.99 | 89.9555 |
| S12 | Lens | -71.023 | 0.434 | | | |
| S13 | Seventh | 6.690 | 0.365 | 1.614 | 25.94 | -8.9256 |
| S14 | Lens | 2.966 | 0.149 | | | |
| S15 | Eighth | 2.234 | 0.616 | 1.567 | 37.40 | 5.0687 |
| S16 | Lens | 8.830 | 0.771 | | | |
| S17 | Ninth | 5.778 | 0.429 | 1.535 | 55.74 | -6.6684 |
| S18 | Lens | 2.154 | 0.302 | | | |
| S19 | Filter | Infinity | 0.210 | | | |
| S20 | | Infinity | 0.786 | | | |
| S21 | Imaging Surface | Infinity | | | | |

The total focal length f of the optical imaging system 900 according to the ninth embodiment of the present disclosure is 6.7057 mm, the TTL is 8.216, the BFL is 1.299, the EPD is 4.4714 mm, the IMG HT is 6 mm, and the FOV is 81.215°.

In the ninth embodiment of the present disclosure, the first lens 901 has a positive refractive power, a first surface of the first lens 901 has a shape convex in the paraxial region, and a second surface of the first lens 901 has a shape concave in the paraxial region.

The second lens 902 has a negative refractive power, the first surface of the second lens 902 has a shape convex in the paraxial region, and the second surface of the second lens 902 has a shape concave in the paraxial region.

The third lens 903 has a positive refractive power, a first surface of the third lens 903 has a shape convex in the paraxial region, and a second surface of the third lens 903 has a shape concave in the paraxial region.

The fourth lens 904 has a positive refractive power, a first surface of the fourth lens 904 has a shape convex in the paraxial region, and a second surface of the fourth lens 904 has a shape concave in the paraxial region.

The fifth lens 905 has a positive refractive power, a first surface of the fifth lens 905 has a shape convex in the paraxial region, and a second surface of the fifth lens 905 has a shape concave in the paraxial region.

The sixth lens 906 has a positive refractive power, and a first surface and a second surface of the sixth lens 906 have a shape convex in the paraxial region.

The seventh lens 907 has a negative refractive power, a first surface of the seventh lens 907 has a shape convex in the paraxial region, and a second surface of the seventh lens 907 has a shape concave in the paraxial region.

The eighth lens 908 has a positive refractive power, a first surface of the eighth lens 908 has a shape convex in the paraxial region, and a second surface of the eighth lens 908 has a shape concave in the paraxial region.

The ninth lens 909 has a negative refractive power, the first surface of the ninth lens 909 has a shape convex in the paraxial region, and the second surface of the ninth lens 909 has a shape concave in the paraxial region.

Additionally, any one or any combination of any two or more of the sixth lens 906 to the ninth lens 909 has at least one inflection point formed on either one or both of the first and second surfaces.

Each surface of the first lens 901 to the ninth lens 909 has aspherical coefficients as illustrated in Table 18. For example, both an object-side surface and an image-side surface of the first lens 901 to the ninth lens 909 are aspherical surfaces.

TABLE 18

| | S1 | S2 | S3 | S4 | S5 | S6 |
|---|---|---|---|---|---|---|
| Conic Constant (K) | −0.709 | −11.412 | −11.778 | −4.027 | −21.406 | −81.677 |
| Fourth Coefficient (A) | 2.754E−03 | −1.862E−02 | −2.952E−02 | −2.041E−02 | −1.184E−02 | 1.337E−03 |
| Sixth Coefficient (B) | −6.168E−04 | 3.328E−02 | 4.400E−02 | 3.300E−02 | 2.722E−02 | −4.514E−02 |
| Eighth Coefficient (C) | 3.921E−03 | −4.671E−02 | −5.573E−02 | −4.873E−02 | −6.929E−02 | 1.787E−01 |
| Tenth Coefficient (D) | −6.914E−03 | 5.517E−02 | 6.607E−02 | 8.396E−02 | 1.224E−01 | −4.761E−01 |
| Twelfth Coefficient (E) | 6.726E−03 | −5.113E−02 | −6.403E−02 | −1.235E−01 | −1.516E−01 | 8.351E−01 |
| Fourteenth Coefficient (F) | −4.105E−03 | 3.532E−02 | 4.608E−02 | 1.370E−01 | 1.333E−01 | −1.012E+00 |
| Sixteenth Coefficient (G) | 1.665E−03 | −1.790E−02 | −2.397E−02 | −1.122E−01 | −8.467E−02 | 8.732E−01 |
| Eighteenth Coefficient (H) | −4.611E−04 | 6.628E−03 | 8.973E−03 | 6.742E−02 | 3.930E−02 | −5.438E−01 |
| Twentieth Coefficient (J) | 8.750E−05 | −1.784E−03 | −2.409E−03 | −2.949E−02 | −1.337E−02 | 2.453E−01 |
| Twenty-second Coefficient (L) | −1.121E−05 | 3.447E−04 | 4.576E−04 | 9.229E−03 | 3.308E−03 | −7.934E−02 |
| Twenty-fourth Coefficient (M) | 9.311E−07 | −4.647E−05 | −5.985E−05 | −2.004E−03 | −5.815E−04 | 1.794E−02 |
| Twenty-sixth Coefficient (N) | −4.595E−08 | 4.146E−06 | 5.108E−06 | 2.856E−04 | 6.889E−05 | −2.690E−03 |
| Twenty-eighth Coefficient (O) | 1.102E−09 | −2.198E−07 | −2.555E−07 | −2.394E−05 | −4.927E−06 | 2.403E−04 |
| Thirtieth Coefficient (P) | −6.059E−12 | 5.240E−09 | 5.669E−09 | 8.917E−07 | 1.601E−07 | −9.682E−06 |

| | S7 | S8 | S9 | S10 | S11 | S12 |
|---|---|---|---|---|---|---|
| Conic Constant (K) | −67.690 | 53.622 | 0.000 | 0.000 | 95.977 | 98.738 |
| Fourth Coefficient (A) | −1.249E−03 | −1.301E−02 | −3.554E−02 | −1.508E−02 | 1.962E−02 | 1.291E−02 |
| Sixth Coefficient (B) | −8.927E−03 | 6.283E−03 | 6.505E−02 | 1.082E−02 | −5.444E−03 | 2.613E−03 |
| Eighth Coefficient (C) | 1.213E−02 | 2.415E−02 | −1.485E−01 | −2.756E−02 | −3.902E−02 | −3.435E−02 |
| Tenth Coefficient (D) | −1.229E−02 | −1.446E−01 | 2.074E−01 | 2.662E−02 | 6.475E−02 | 4.176E−02 |
| Twelfth Coefficient (E) | −1.197E−03 | 3.343E−01 | −1.781E−01 | −6.860E−03 | −5.680E−02 | −2.827E−02 |
| Fourteenth Coefficient (F) | 1.834E−02 | −4.600E−01 | 8.474E−02 | −1.039E−02 | 3.267E−02 | 1.247E−02 |
| Sixteenth Coefficient (G) | −2.404E−02 | 4.198E−01 | −7.159E−03 | 1.326E−02 | −1.312E−02 | −3.764E−03 |
| Eighteenth Coefficient (H) | 1.726E−02 | −2.657E−01 | −1.871E−02 | −7.914E−03 | 3.760E−03 | 7.892E−04 |
| Twentieth Coefficient (J) | −7.906E−03 | 1.187E−01 | 1.384E−02 | 2.951E−03 | −7.712E−04 | −1.146E−04 |

TABLE 18-continued

| | | | | | | |
|---|---|---|---|---|---|---|
| Twenty-second Coefficient (L) | 2.412E−03 | −3.732E−02 | −5.204E−03 | −7.306E−04 | 1.121E−04 | 1.132E−05 |
| Twenty-fourth Coefficient (M) | −4.897E−04 | 8.090E−03 | 1.199E−03 | 1.203E−04 | −1.125E−05 | −7.375E−07 |
| Twenty-sixth Coefficient (N) | 6.351E−05 | −1.151E−03 | −1.706E−04 | −1.267E−05 | 7.396E−07 | 3.016E−08 |
| Twenty-eighth Coefficient (O) | −4.741E−06 | 9.669E−05 | 1.383E−05 | 7.720E−07 | −2.863E−08 | −7.171E−10 |
| Thirtieth Coefficient (P) | 1.534E−07 | −3.637E−06 | −4.894E−07 | −2.067E−08 | 4.939E−10 | 8.371E−12 |

| | S13 | S14 | S15 | S16 | S17 | S18 |
|---|---|---|---|---|---|---|
| Conic Constant (K) | 0.000 | −22.217 | −7.771 | −92.387 | −27.005 | −7.204 |
| Fourth Coefficient (A) | −4.961E−02 | −5.712E−02 | 8.226E−03 | 6.585E−02 | −7.747E−02 | −4.330E−02 |
| Sixth Coefficient (B) | 6.166E−02 | 3.313E−02 | −1.857E−02 | −4.235E−02 | 1.367E−02 | 5.999E−03 |
| Eighth Coefficient (C) | −5.698E−02 | −1.261E−02 | 1.195E−02 | 1.741E−02 | 1.589E−03 | 1.216E−03 |
| Tenth Coefficient (D) | 3.702E−02 | 1.786E−03 | −6.598E−03 | −5.507E−03 | −1.194E−03 | −7.715E−04 |
| Twelfth Coefficient (E) | −1.752E−02 | 1.166E−03 | 2.629E−03 | 1.273E−03 | 2.619E−04 | 1.721E−04 |
| Fourteenth Coefficient (F) | 6.195E−03 | −8.649E−04 | −7.547E−04 | −2.113E−04 | −3.369E−05 | −2.237E−05 |
| Sixteenth Coefficient (G) | −1.673E−03 | 2.854E−04 | 1.557E−04 | 2.517E−05 | 2.890E−06 | 1.898E−06 |
| Eighteenth Coefficient (H) | 3.453E−04 | −5.792E−05 | −2.293E−05 | −2.150E−06 | −1.734E−07 | −1.101E−07 |
| Twentieth Coefficient (J) | −5.370E−05 | 7.828E−06 | 2.398E−06 | 1.314E−07 | 7.399E−09 | 4.447E−09 |
| Twenty-second Coefficient (L) | 6.129E−06 | −7.200E−07 | −1.765E−07 | −5.680E−09 | −2.238E−10 | −1.250E−10 |
| Twenty-fourth Coefficient (M) | −4.936E−07 | 4.464E−08 | 8.940E−09 | 1.695E−10 | 4.690E−12 | 2.399E−12 |
| Twenty-sixth Coefficient (N) | 2.637E−08 | −1.787E−09 | −2.968E−10 | −3.317E−12 | −6.475E−14 | −2.993E−14 |
| Twenty-eighth Coefficient (O) | −8.348E−10 | 4.174E−11 | 5.819E−12 | 3.834E−14 | 5.295E−16 | 2.187E−16 |
| Thirtieth Coefficient (P) | 1.181E−11 | −4.321E−13 | −5.110E−14 | −1.983E−16 | −1.942E−18 | −7.088E−19 |

Additionally, the optical imaging system described above may have the aberration characteristics illustrated in FIG. 18.

Figure 19:
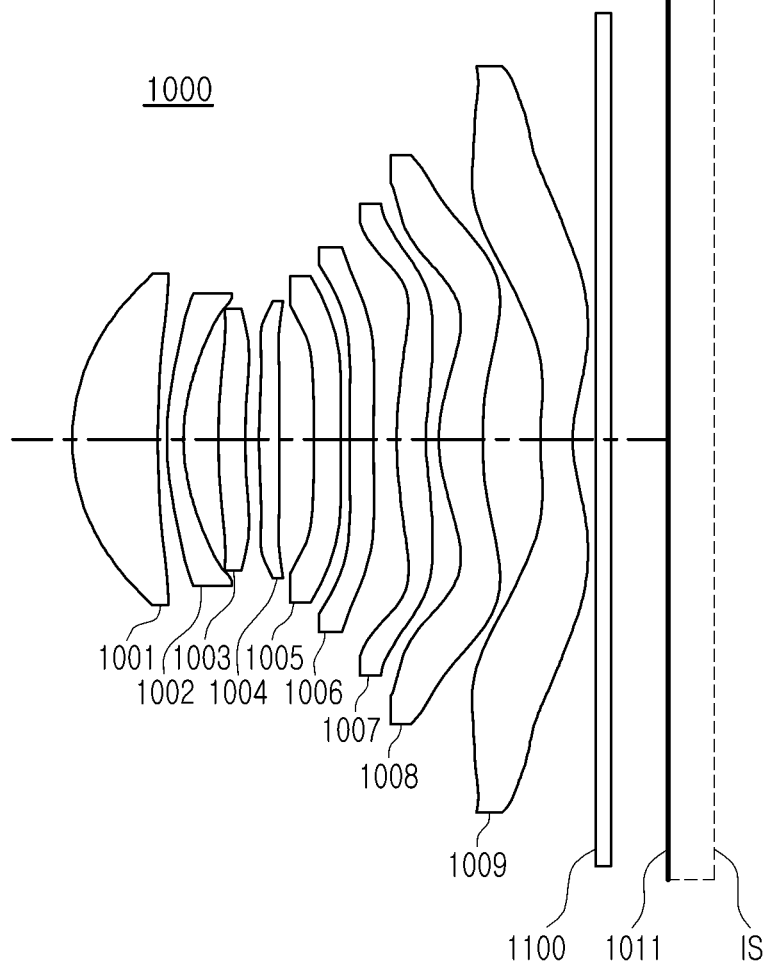
FIG. 19 illustrates a structural view of an optical imaging system according to a tenth embodiment of the present disclosure.
Figure 20:
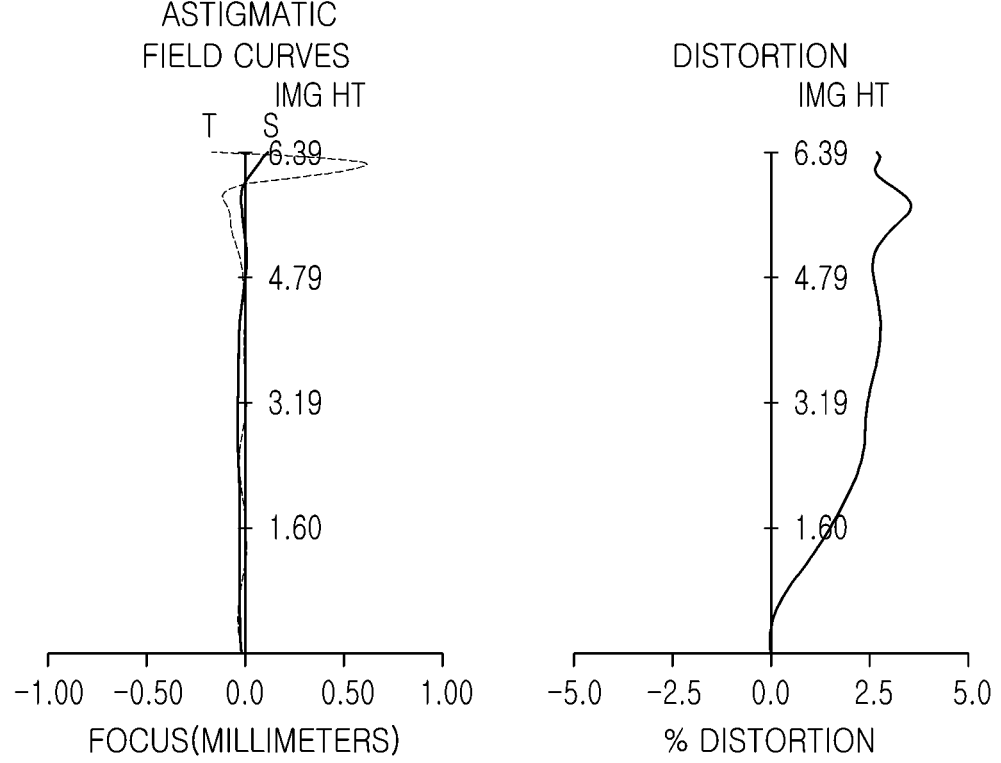
FIG. 20 is a view illustrating aberration characteristics of the optical imaging system illustrated in FIG. 19.

FIG. 19 illustrates a structural view of an optical imaging system according to a tenth embodiment of the present disclosure, and FIG. 20 is a view illustrating aberration characteristics of the optical imaging system illustrated in FIG. 19.

Referring to FIG. 19, an optical imaging system 1000 according to the tenth embodiment of the present disclosure may include a first lens 1001, a second lens 1002, a third lens 1003, a fourth lens 1004, a fifth lens 1005, a sixth lens 1006, a seventh lens 1007, an eighth lens 1008, and a ninth lens 1009, and may further include a filter 1010 and an image sensor IS.

The optical imaging system 1000 according to the tenth embodiment of the present disclosure may focus an image on an imaging surface 1011. The imaging surface 1011 may be a surface on which an image is focused by the optical imaging system. For example, the imaging surface 1011 may be a surface of the image sensor IS on which an image is focused by the optical imaging system.

The lens characteristics of each lens (a radius of curvature, a thickness of the lens or a distance between the lens and the next lens, a refractive index, an Abbe number, and a focal length) are illustrated in Table 19.

TABLE 19

| Surface Number | Element | Radius of Curvature | Thickness or Distance | Refractive Index | Abbe Number | Focal Length |
|---|---|---|---|---|---|---|
| S1 | First | 3.037 | 1.181 | 1.544 | 55.99 | 6.9913 |
| S2 | Lens | 12.782 | 0.123 | | | |
| S3 | Second | 3.958 | 0.230 | 1.671 | 19.24 | −15.1259 |
| S4 | Lens | 2.790 | 0.497 | | | |
| S5 | Third | 7.154 | 0.390 | 1.544 | 55.99 | 94.6849 |
| S6 | Lens | 8.142 | 0.172 | | | |
| S7 | Fourth | 8.859 | 0.259 | 1.544 | 55.99 | 23.9112 |
| S8 | Lens | 27.242 | 0.507 | | | |
| S9 | Fifth | 75.507 | 0.344 | 1.671 | 19.24 | −69.3002 |
| S10 | Lens | 28.933 | 0.126 | | | |
| S11 | Sixth | 404.015 | 0.330 | 1.544 | 55.99 | −104.7571 |
| S12 | Lens | 50.116 | 0.317 | | | |

TABLE 19-continued

| Surface Number | Element | Radius of Curvature | Thickness or Distance | Refractive Index | Abbe Number | Focal Length |
|---|---|---|---|---|---|---|
| S13 | Seventh | 5.504 | 0.405 | 1.614 | 25.94 | −13.2987 |
| S14 | Lens | 3.208 | 0.178 | | | |
| S15 | Eighth | 2.260 | 0.608 | 1.567 | 37.40 | 5.3155 |
| S16 | Lens | 7.995 | 0.795 | | | |
| S17 | Ninth | 5.277 | 0.444 | 1.535 | 55.74 | −6.7795 |
| S18 | Lens | 2.091 | 0.316 | | | |
| S19 | Filter | Infinity | 0.210 | | | |
| S20 | | Infinity | 0.790 | | | |
| S21 | Imaging Surface | Infinity | | | | |

The total focal length f of the optical imaging system 1000 according to the tenth embodiment of the present disclosure is 6.6506 mm, the TTL is 8.220, the BFL is 1.316, the EPD is 4.4607 mm, the IMG HT is 6 mm, and the FOV is 81.659°.

In the tenth embodiment of the present disclosure, the first lens 1001 has a positive refractive power, a first surface of the first lens 1001 has a shape convex in the paraxial region, and a second surface of the first lens 1001 has a shape concave in the paraxial region.

The second lens 1002 has a negative refractive power, a first surface of the second lens 1002 has a shape convex in the paraxial region, and the second surface of the second lens 1002 has a shape concave in the paraxial region.

The third lens 1003 has a positive refractive power, a first surface of the third lens 1003 has a shape convex in the paraxial region, and a second surface of the third lens 1003 has a shape concave in the paraxial region.

The fourth lens 1004 has a positive refractive power, a first surface of the fourth lens 1004 has a shape convex in the paraxial region, and a second surface of the fourth lens 1004 has a shape concave in the paraxial region.

The fifth lens 1005 has a negative refractive power, a first surface of the fifth lens 1005 has a shape convex in the paraxial region, and a second surface of the fifth lens 1005 has a shape concave in the paraxial region.

The sixth lens 1006 has a negative refractive power, a first surface of the sixth lens 1006 has a shape convex in the paraxial region, and a second surface of the sixth lens 1006 has a shape concave in the paraxial region.

The seventh lens 1007 has a negative refractive power, a first surface of the seventh lens 1007 has a shape convex in the paraxial region, and a second surface of the seventh lens 1007 has a shape concave in the paraxial region.

The eighth lens 1008 has a positive refractive power, a first surface of the eighth lens 1008 has a shape convex in the paraxial region, and a second surface of the eighth lens 1008 has a shape concave in the paraxial region.

The ninth lens 1009 has a negative refractive power, a first surface of the ninth lens 1009 has a shape convex in the paraxial region, and a second surface of the ninth lens 1009 has a shape concave in the paraxial region.

Additionally, one or any combination of any two or more of the sixth lens 1006 to the ninth lens 1009 has at least one inflection point formed on either one or both of the first and second surfaces.

Each surface of the first lens 1001 to the ninth lens 1009 has aspherical coefficients as illustrated in Table 20. For example, both an object-side surface and an image-side surface of the first lens 1001 to the ninth lens 1009 are aspherical surfaces.

TABLE 20

| | S1 | S2 | S3 | S4 | S5 | S6 |
|---|---|---|---|---|---|---|
| Conic Constant (K) | −0.706 | −10.477 | −11.668 | −4.031 | −22.610 | −89.322 |
| Fourth Coefficient (A) | 3.335E−03 | −2.415E−02 | −4.159E−02 | −2.944E−02 | −1.302E−02 | 1.325E−03 |
| Sixth Coefficient (B) | −4.145E−03 | 3.943E−02 | 7.232E−02 | 4.810E−02 | 3.681E−02 | −4.768E−02 |
| Eighth Coefficient (C) | 1.059E−02 | −3.508E−02 | −6.691E−02 | 3.494E−03 | −1.016E−01 | 1.837E−01 |
| Tenth Coefficient (D) | −1.473E−02 | 1.958E−02 | 3.234E−02 | −1.518E−01 | 1.920E−01 | −4.809E−01 |
| Twelfth Coefficient (E) | 1.304E−02 | −7.690E−03 | −8.171E−04 | 3.291E−01 | −2.492E−01 | 8.398E−01 |
| Fourteenth Coefficient (F) | −7.704E−03 | 3.029E−03 | −1.093E−02 | −4.042E−01 | 2.261E−01 | −1.018E+00 |
| Sixteenth Coefficient (G) | 3.124E−03 | −1.704E−03 | 8.795E−03 | 3.295E−01 | −1.468E−01 | 8.792E−01 |
| Eighteenth Coefficient (H) | −8.829E−04 | 9.363E−04 | −3.942E−03 | −1.870E−01 | 6.908E−02 | −5.485E−01 |
| Twentieth Coefficient (J) | 1.743E−04 | −3.660E−04 | 1.169E−03 | 7.499E−02 | −2.359E−02 | 2.478E−01 |
| Twenty-second Coefficient (L) | −2.379E−05 | 9.556E−05 | −2.384E−04 | −2.115E−02 | 5.801E−03 | −8.031E−02 |
| Twenty-fourth Coefficient (M) | 2.179E−06 | −1.639E−05 | 3.334E−05 | 4.103E−03 | −1.002E−03 | 1.820E−02 |
| Twenty-sixth Coefficient (N) | −1.265E−07 | 1.776E−06 | −3.065E−06 | −5.209E−04 | 1.156E−04 | −2.736E−03 |
| Twenty-eighth Coefficient (O) | 4.142E−09 | −1.106E−07 | 1.672E−07 | 3.894E−05 | −7.991E−06 | 2.452E−04 |

TABLE 20-continued

| | | | | | | |
|---|---|---|---|---|---|---|
| Thirtieth Coefficient (P) | −5.683E−11 | 3.015E−09 | −4.105E−09 | −1.300E−06 | 2.503E−07 | −9.911E−06 |

| | S7 | S8 | S9 | S10 | S11 | S12 |
|---|---|---|---|---|---|---|
| Conic Constant (K) | −71.419 | 62.158 | 0.000 | 0.000 | 86.095 | −99.000 |
| Fourth Coefficient (A) | −1.465E−03 | −2.228E−03 | −2.641E−02 | −2.983E−03 | 3.705E−02 | 1.349E−02 |
| Sixth Coefficient (B) | −7.736E−03 | −4.251E−02 | 7.575E−03 | −6.158E−02 | −7.501E−02 | −7.017E−03 |
| Eighth Coefficient (C) | 1.056E−02 | 1.713E−01 | 5.248E−03 | 1.423E−01 | 7.454E−02 | −4.173E−02 |
| Tenth Coefficient (D) | −1.182E−02 | −4.355E−01 | −4.218E−02 | −2.079E−01 | −3.581E−02 | 7.602E−02 |
| Twelfth Coefficient (E) | 1.074E−05 | 7.274E−01 | 9.253E−02 | 2.100E−01 | −2.769E−03 | −6.780E−02 |
| Fourteenth Coefficient (F) | 1.579E−02 | −8.366E−01 | −1.222E−01 | −1.544E−01 | 1.425E−02 | 3.772E−02 |
| Sixteenth Coefficient (G) | −2.121E−02 | 6.809E−01 | 1.081E−01 | 8.423E−02 | −9.141E−03 | −1.418E−02 |
| Eighteenth Coefficient (H) | 1.516E−02 | −3.979E−01 | −6.631E−02 | −3.407E−02 | 3.253E−03 | 3.736E−03 |
| Twentieth Coefficient (J) | −6.817E−03 | 1.675E−01 | 2.846E−02 | 1.011E−02 | −7.463E−04 | −6.995E−04 |
| Twenty-second Coefficient (L) | 2.013E−03 | −5.031E−02 | −8.515E−03 | −2.155E−03 | 1.149E−04 | 9.295E−05 |
| Twenty-fourth Coefficient (M) | −3.887E−04 | 1.051E−02 | 1.737E−03 | 3.198E−04 | −1.184E−05 | −8.588E−06 |
| Twenty-sixth Coefficient (N) | 4.671E−05 | −1.450E−03 | −2.303E−04 | −3.124E−05 | 7.849E−07 | 5.256E−07 |
| Twenty-eighth Coefficient (O) | −3.089E−06 | 1.187E−04 | 1.787E−05 | 1.799E−06 | −3.028E−08 | −1.918E−08 |
| Thirtieth Coefficient (P) | 8.083E−08 | −4.366E−06 | −6.150E−07 | −4.619E−08 | 5.171E−10 | 3.163E−10 |

| | S13 | S14 | S15 | S16 | S17 | S18 |
|---|---|---|---|---|---|---|
| Conic Constant (K) | 0.000 | −22.060 | −7.644 | −98.129 | −27.954 | −6.755 |
| Fourth Coefficient (A) | −5.237E−02 | −8.052E−02 | −3.533E−03 | 6.459E−02 | −7.140E−02 | −4.111E−02 |
| Sixth Coefficient (B) | 7.230E−02 | 8.871E−02 | 7.010E−03 | −4.142E−02 | 7.196E−03 | 3.709E−03 |
| Eighth Coefficient (C) | −7.729E−02 | −7.736E−02 | −1.291E−02 | 1.655E−02 | 4.295E−03 | 2.079E−03 |
| Tenth Coefficient (D) | 5.538E−02 | 4.672E−02 | 7.527E−03 | −5.002E−03 | −1.881E−03 | −9.454E−04 |
| Twelfth Coefficient (E) | −2.732E−02 | −1.911E−02 | −2.503E−03 | 1.093E−03 | 3.799E−04 | 1.924E−04 |
| Fourteenth Coefficient (F) | 9.633E−03 | 5.379E−03 | 4.925E−04 | −1.715E−04 | −4.791E−05 | −2.365E−05 |
| Sixteenth Coefficient (G) | −2.518E−03 | −1.066E−03 | −5.290E−05 | 1.935E−05 | 4.118E−06 | 1.913E−06 |
| Eighteenth Coefficient (H) | 4.983E−04 | 1.506E−04 | 1.512E−06 | −1.570E−06 | −2.500E−07 | −1.056E−07 |
| Twentieth Coefficient (J) | −7.487E−05 | −1.519E−05 | 3.814E−07 | 9.122E−08 | 1.084E−08 | 4.025E−09 |
| Twenty-second Coefficient (L) | 8.396E−06 | 1.083E−06 | −6.030E−08 | −3.747E−09 | −3.341E−10 | −1.053E−10 |
| Twenty-fourth Coefficient (M) | −6.762E−07 | −5.298E−08 | 4.385E−09 | 1.060E−10 | 7.138E−12 | 1.838E−12 |
| Twenty-sixth Coefficient (N) | 3.664E−08 | 1.686E−09 | −1.820E−10 | −1.962E−12 | −1.005E−13 | −2.017E−14 |
| Twenty-eighth Coefficient (O) | −1.187E−09 | −3.125E−11 | 4.162E−12 | 2.134E−14 | 8.380E−16 | 1.226E−16 |
| Thirtieth Coefficient (P) | 1.729E−11 | 2.540E−13 | −4.090E−14 | −1.034E−16 | −3.133E−18 | −2.989E−19 |

Additionally, the optical imaging system described above may have the aberration characteristics illustrated in FIG. 20.

Table 21 shows conditional expression values of the optical imaging system according to each embodiment.

TABLE 21

| Conditional Expression | Emb. 1 | Emb. 2 | Emb. 3 | Emb. 4 | Emb. 5 |
|---|---|---|---|---|---|
| TTL/(2 × IMG HT) < 0.69 | 0.685 | 0.685 | 0.685 | 0.685 | 0.685 |
| 1.3 < f/EPD < 1.51 | 1.497 | 1.500 | 1.500 | 1.499 | 1.500 |
| 0 < D1/f < 0.05 | 0.015 | 0.015 | 0.015 | 0.015 | 0.018 |
| 25 < v1 − v2 < 45 | 36.75 | 36.75 | 36.75 | 36.75 | 36.75 |
| 1.660 ≤ Nmax ≤ 1.700 | 1.671 | 1.671 | 1.671 | 1.671 | 1.671 |
| 0.8 < f1/f < 1.2 | 1.062 | 1.056 | 1.055 | 1.043 | 1.026 |
| BFL/f < 0.25 | 0.200 | 0.198 | 0.199 | 0.196 | 0.195 |
| 0 < D3/f < 0.05 | 0.018 | 0.019 | 0.02 | 0.018 | 0.017 |
| 25 < v1 − v5 < 45 | 36.75 | 36.75 | 36.75 | 36.75 | 36.75 |
| 25 < v1 − v7 < 35 | 30.05 | 30.05 | 30.05 | 30.05 | 30.05 |
| 10 < v8 − v7 < 15 | 11.47 | 11.47 | 11.47 | 11.47 | 11.47 |
| −2.6 < f2/f1 < −2 | −2.275 | −2.275 | −2.356 | −2.226 | −2.149 |
| 1.25 < f34/|f2| < 1.7 | 1.351 | 1.339 | 1.298 | 1.334 | 1.599 |
| 0.8 < (2 × D34)/D12 < 1.1 | 1.024 | 1.026 | 1.080 | 1.002 | 1.005 |

| Conditional Expression | Emb. 6 | Emb. 7 | Emb. 8 | Emb. 9 | Emb. 10 |
|---|---|---|---|---|---|
| TTL/(2 × IMG HT) < 0.69 | 0.685 | 0.685 | 0.685 | 0.685 | 0.685 |
| 1.3 < f/EPD < 1.51 | 1.498 | 1.499 | 1.500 | 1.500 | 1.491 |
| 0 < D1/f < 0.05 | 0.015 | 0.015 | 0.016 | 0.015 | 0.018 |
| 25 < v1 − v2 < 45 | 36.75 | 36.75 | 36.75 | 36.75 | 36.75 |
| 1.660 ≤ Nmax ≤ 1.700 | 1.671 | 1.671 | 1.671 | 1.671 | 1.671 |
| 0.8 < f1/f < 1.2 | 1.055 | 1.046 | 1.044 | 1.033 | 1.051 |
| BFL/f < 0.25 | 0.198 | 0.200 | 0.200 | 0.194 | 0.198 |
| 0 < D3/f < 0.05 | 0.02 | 0.024 | 0.025 | 0.016 | 0.026 |
| 25 < v1 − v5 < 45 | 36.75 | 36.75 | 36.75 | 36.75 | 36.75 |
| 25 < v1 − v7 < 35 | 30.05 | 30.05 | 30.05 | 30.05 | 30.05 |
| 10 < v8 − v7 < 15 | 11.47 | 11.47 | 11.47 | 11.47 | 11.47 |
| −2.6 < f2/f1 < −2 | −2.256 | −2.290 | −2.295 | −2.188 | −2.164 |
| 1.25 < f34/|f2| < 1.7 | 1.344 | 1.322 | 1.318 | 1.621 | 1.274 |
| 0.8 < (2 × D34)/D12 < 1.1 | 1.030 | 1.078 | 1.083 | 0.991 | 1.071 |

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens, a second lens, a third lens, a fourth lens, a fifth lens, a sixth lens, a seventh lens, an eighth lens, and a ninth lens sequentially arranged in ascending numerical order along an optical axis of the optical imaging system from an object side of the optical imaging system toward an imaging surface of the optical imaging system,
wherein the first lens has a positive refractive power, the second lens has a negative refractive power, and the fourth lens has a positive refractive power, a refractive index of the second lens is greater than a refractive index of the first lens and a refractive index of the third lens,
each of at least two lenses comprising the second lens among the first to ninth lenses has a refractive index equal to or greater than 1.67, TTL/(2×IMG HT)<0.69 and 25<v1−v2<45 are satisfied, where TTL is a distance on the optical axis from an object-side surface of the first lens to the imaging surface, IMG HT is one half of a diagonal length of the imaging surface, v1 is an Abbe number of the first lens, and v2 is an Abbe number of the second lens, and
0.8< (2×D34)/D12<1.1 is satisfied, where D12 is a distance on the optical axis from the object-side surface of the first lens to an image-side surface of the second lens, and D34 is a distance on the optical axis from an object-side surface of the third lens to an image-side surface of the fourth lens.

2. The optical imaging system of claim 1, wherein 25<v1−v5<45 is satisfied, where v5 is an Abbe number of the fifth lens.

3. The optical imaging system of claim 2, wherein each of the second lens and the fifth lens has a refractive index equal to or greater than 1.67.

4. The optical imaging system of claim 2, wherein the seventh lens has a refractive index greater than 1.61, and 25<v1−v7<35 is satisfied, where v7 is an Abbe number of the seventh lens.

5. The optical imaging system of claim 2, wherein 1.660≤Nmax≤1.700 is satisfied, where Nmax is a maximum value of refractive indexes of the first to ninth lenses.

6. The optical imaging system of claim 1, wherein 10<v8−v7<15 is satisfied, where v7 is an Abbe number of the seventh lens, and v8 is an Abbe number of the eight lens.

7. The optical imaging system of claim 1, wherein 1.3<f/EPD<1.51 is satisfied, where f is a total focal length of the optical imaging system, and an EPD is an entrance pupil diameter of the optical imaging system.

8. The optical imaging system of claim 1, wherein either one or both of $0<D1/f<0.05$ and $0<D3/f<0.05$ is satisfied, where D1 is a distance on the optical axis between an image-side surface of the first lens and an object-side surface of the second lens, D3 is a distance on the optical axis between an image-side surface of the third lens and an object-side surface of the fourth lens, and f is a total focal length of the optical imaging system.

9. The optical imaging system of claim 8, wherein BFL/f<0.25 is satisfied where BFL is a distance on the optical axis from an image-side surface of the ninth lens to the imaging surface.

10. The optical imaging system of claim 1, wherein $0.8<f1/f<1.2$ is satisfied, where f1 is a focal length of the first lens, and f is a total focal length of the optical imaging system.

11. The optical imaging system of claim 1, wherein $|f2|>|f1|$ is satisfied, where $|f2|$ is an absolute value of a focal length f2 of the second lens, and $|f1|$ is an absolute value of a focal length f1 of the first lens.

12. The optical imaging system of claim 11, wherein $-2.6<f2/f1<-2$ is satisfied.

13. The optical imaging system of claim 1, wherein f34>0 and f34>|f2| are satisfied, where f34 is a synthetic focal length of the third lens and the fourth lens, and $|f2|$ is an absolute value of a focal length f2 of the second lens.

14. The optical imaging system of claim 13, wherein $1.25<f34/|f2|<1.7$ is satisfied.

15. The optical imaging system of claim 1, wherein each of the first lens to the fifth lens has a convex object-side surface in a paraxial region thereof, and a concave image-side surface in a paraxial region thereof.

16. The optical imaging system of claim 1, wherein the sixth lens has a convex object-side surface in a paraxial region thereof, and a convex image-side surface in a paraxial region thereof.

17. The optical imaging system of claim 1, wherein the sixth lens has a convex object-side surface in a paraxial region thereof, and a concave image-side surface in a paraxial region thereof.

18. The optical imaging system of claim 1, wherein the sixth lens has a concave object-side surface in a paraxial region thereof, and a convex image-side surface in a paraxial region thereof.

19. The optical imaging system of claim 1, wherein each of the seventh lens to the ninth lens has a convex object-side surface in a paraxial region thereof, and a concave image-side surface in a paraxial region thereof.

20. The optical imaging system of claim 1, wherein the ninth lens has a negative refractive power.

* * * * *